(12) United States Patent
Takagi et al.

(10) Patent No.: US 9,115,277 B2
(45) Date of Patent: Aug. 25, 2015

(54) POROUS POLYOLEFIN RESIN FILM

(75) Inventors: Yoshihito Takagi, Shiga (JP); Takatoshi Muta, Shiga (JP); Tomoyuki Nemoto, Shiga (JP)

(73) Assignee: Mitsubishi Plastics, Inc., Tokyo (JP)

( * ) Notice: Subject to any disclaimer, the term of this patent is extended or adjusted under 35 U.S.C. 154(b) by 46 days.

(21) Appl. No.: 13/877,935

(22) PCT Filed: Oct. 5, 2011

(86) PCT No.: PCT/JP2011/072929
§ 371 (c)(1),
(2), (4) Date: May 16, 2013

(87) PCT Pub. No.: WO2012/046753
PCT Pub. Date: Apr. 12, 2012

(65) Prior Publication Data
US 2013/0236793 A1    Sep. 12, 2013

(30) Foreign Application Priority Data

Oct. 6, 2010    (JP) .................................. 2010-226180

(51) Int. Cl.
| | |
|---|---|
| *H01M 2/16* | (2006.01) |
| *C08L 23/12* | (2006.01) |
| *C08L 23/02* | (2006.01) |
| *C08J 5/18* | (2006.01) |
| *B32B 7/02* | (2006.01) |
| *C08L 83/04* | (2006.01) |
| *H01M 2/14* | (2006.01) |

(52) U.S. Cl.
CPC . *C08L 23/12* (2013.01); *B32B 7/02* (2013.01); *C08J 5/18* (2013.01); *C08L 23/02* (2013.01); *C08L 83/04* (2013.01); *H01M 2/166* (2013.01); *H01M 2/1653* (2013.01); *C08J 2323/02* (2013.01); *H01M 2/145* (2013.01); *Y10T 428/24942* (2015.01)

(58) Field of Classification Search
None
See application file for complete search history.

(56) References Cited

U.S. PATENT DOCUMENTS 6,245,270 B1 *   6/2001   Mizutani et al. .............. 264/154
2006/0019153 A1 *   1/2006   Imachi et al. .................. 429/128
(Continued)

FOREIGN PATENT DOCUMENTS

| JP | 7 238178 | 9/1995 |
|---|---|---|
| JP | 8 182921 | 7/1996 |

(Continued)

OTHER PUBLICATIONS

International Search Report Issued Nov. 15, 2011 in PCT/JP11/72929 Filed Oct. 5, 2011.

(Continued)

*Primary Examiner* — Patrick Ryan
*Assistant Examiner* — Wyatt McConnell
(74) *Attorney, Agent, or Firm* — Oblon, McClelland, Maier & Neustadt, L.L.P.

(57) ABSTRACT

The purpose is to provide a porous polyolefin resin film which has high gas permeability and a high porosity, and which can exhibit excellent properties including break down properties when used as a separator for a non-aqueous electrolyte secondary battery. The present invention relates to a porous polyolefin resin film which is produced from a resin composition (a) containing a polyolefin resin as the main component and additionally containing organic-inorganic hybrid particles (f).

17 Claims, 2 Drawing Sheets

(56) References Cited

U.S. PATENT DOCUMENTS

| | | |
|---|---|---|
| 2006/0089478 A1 | 4/2006 | Noda |
| 2007/0178384 A1* | 8/2007 | Kajita et al. .................. 429/251 |
| 2009/0226807 A1* | 9/2009 | Nakamura .................... 429/186 |

FOREIGN PATENT DOCUMENTS

| | | |
|---|---|---|
| JP | 9 176352 | 7/1997 |
| JP | 10 296930 | 11/1998 |
| JP | 2883726 | 4/1999 |
| JP | 2000-7819 | 1/2000 |
| JP | 3443934 | 9/2003 |
| JP | 2005 171230 | 6/2005 |
| JP | 2010 180295 | 8/2010 |
| JP | 2011 6585 | 1/2011 |
| WO | 02 066233 | 8/2002 |
| WO | WO 2010/053172 A1 | 5/2010 |

OTHER PUBLICATIONS

Extended Search Report issued Mar. 21, 2014 in European Application No. 11830685.1.

* cited by examiner

POROUS POLYOLEFIN RESIN FILM

CROSS-REFERENCE TO RELATED APPLICATIONS

This application is a National Stage of PCT/JP2011/072929 filed on May 10, 2011. This application is based upon and claims the benefit of priority to Japanese Application No. 2010-226180 filed on Jun. 10, 2010.

BACKGROUND OF THE INVENTION

1. Technical Field

The present invention relates to a porous polyolefin resin film which can be utilized as packing, hygiene, livestock, agricultural, building, medical materials, a separation film, a light diffusing plate, and a separator for a battery, and particularly relates to a porous polyolefin resin film which can be utilized as a separator for a nonaqueous electrolytic solution battery.

2. Background Art

A porous polypropylene film having a large number of intercommunicable micropores is utilized in various fields. For example, the porous polypropylene film is utilized as separation films to produce ultrapure water, purify chemicals, and treat water; waterproof moisture-permeable films for use in clothes and sanitary materials; and separators for use in batteries. As a method of producing the porous polypropylene film, a method of melting an inorganic filler such as calcium carbonate, barium sulfate or the like and mixing the calcium carbonate, the barium sulfate or the like with the polypropylene to form a film and thereafter stretching the film to make the film porous is known. But the porous film obtained by carrying out the above-described method has a problem that a defective dispersion portion is formed owing to a low compatibility between the inorganic filler and the polypropylene. Thereby pin holes are liable to be formed in stretching the film to make the film porous. In addition the inorganic filler drops from the resin composition while the porous polypropylene film is being produced or used and contaminates a production line.

Various methods of stretching a propylene sheet containing a β crystal are proposed. In Japanese Patent Publication No. 3443934 (patent document 1), the porous film obtained by stretching the β crystal-containing propylene sheet to which the amide compound has been added is proposed. In WO Publication 2002/066233 (patent document 2), the method of producing the porous polypropylene film by sequentially biaxially stretching polypropylene containing needle-shaped β crystal is described. As the methods of producing the porous polypropylene film using the polypropylene containing the β crystal as disclosed in the above-described publications, the stretch ratio in the longitudinal direction (hereinafter referred to as "MD stretch ratio") and the stretch ratio in the width direction (hereinafter referred to as "TD stretch ratio") are increased to improve the air-permeable characteristic of the porous polypropylene film by increasing the number of pores in the porous film.

In recent years, a large lithium-ion battery has come to be used for a hybrid car, tools, and the like and generate a high output. It is necessary to use a separator having a low electric resistance to allow the battery to have a high output. To this end, in the case where the porous polyolefin resin film is used as the separator for the battery, the separator is demanded to have a high porosity and a high air permeability. Because the battery has come to generate a high output, the temperature inside the battery rises. To prevent a short-circuit from occurring between positive and negative electrodes owing to a thermal contraction of the separator, the separator is demanded to have a low thermal contraction percentage at a high temperature.

To comply with the above-described demand, in Japanese Patent No. 2883726 (patent document 3), there is proposed a method of producing the porous film by processing the resin composition containing the β crystal-containing polypropylene resin to which the inorganic substance has been added (in U.S. Pat. No. 2,883,726 (patent document 3) into a sheet and stretching the sheet in a specific condition. The method proposed in Japanese Patent Application Laid-Open No. 09-176352 (patent document 4) is similar to the above-described method except that the resin particles are added to the β crystal-containing polypropylene resin.

In Japanese Patent Application Laid-Open No. 2005-171230 (patent document 5), there is proposed a method of producing the porous film by adding 0.2 to 10 parts by weight of the resin incompatible with polypropylene and having a high melting point to the β crystal-containing polypropylene resin.

PRIOR ART DOCUMENT

Patent Document

Patent document 1: Japanese Patent No. 3443934
Patent document 2: WO No. 2002/066233
Patent document 3: Japanese Patent No. 2883726
Patent document 4: Japanese Patent Application Laid-Open No. 9-176352
Patent document 5: Japanese Patent Application Laid-Open No. 2005-171230

SUMMARY OF THE INVENTION

Problems to be Solved by the Invention

But the method described in the patent documents 1 and 2 has a problem that to generate a high porosity and a high air permeability, it is necessary to stretch the β crystal-containing polypropylene at a high ratio and thus the film has a high thermal contraction percentage owing to the crystalline orientation.

The methods described in the patent documents 3 and 4 have a problem that because a large amount of the inorganic substance or the resin particles are added to the β crystal-containing polypropylene resin, pin holes are liable to be generated in stretching the unporous sheet to make it porous, and the inorganic substance or the resin particles drop from the β crystal-containing polypropylene resin during production or in use, thus contaminating a production line.

The method described in the patent document 5 has a problem that it is difficult to finely disperse the resin having a high melting point in the polypropylene and in addition pinholes are liable to be formed.

It is an object of the present invention to solve the above-described problems. That is, an object of the present invention is to provide a porous polyolefin resin film having a high air-permeable characteristic and a high porosity.

Means for Solving the Problem

The present invention provides a porous polyolefin resin film having a resin composition (a) containing a polyolefin resin as a main component thereof and organic-inorganic hybrid particles (f).

It is preferable that in the present invention, an addition amount of the organic-inorganic hybrid particles (f) is set to not less than 1 mass % nor more than 10 mass % for 100 mass % of the polyolefin resin.

It is preferable that an air permeability of the porous polyolefin resin film of the present invention is set to not less than 10 seconds/100 ml nor more than 200 seconds/100 ml.

It is preferable that a porosity of the porous polyolefin resin film of the present invention is set to 55 to 90%.

It is preferable that the porous polyolefin resin film of the present invention is formed by laminating a layer essentially consisting of the resin composition (a) and a layer consisting of a resin composition (b) having a crystalline melting peak temperature lower than that of the resin composition (a) one upon another.

It is preferable that in the present invention, the polyolefin resin is a polypropylene resin having a β crystal activity.

The present invention provides a separator for a nonaqueous electrolytic solution secondary battery in which the porous polyolefin resin film of the present invention is used.

The present invention provides a nonaqueous electrolytic solution secondary battery in which the separator for the nonaqueous electrolytic solution secondary battery is used.

Effect of the Invention

The present invention provides the porous polyolefin resin film having a high air-permeable characteristic and a high porosity. Because the porous polyolefin resin film has excellent properties such as an excellent break-down property, the porous polyolefin resin film can used as a separator for a nonaqueous electrolytic solution secondary battery.

MODE FOR CARRYING OUT THE INVENTION

Figure 1:
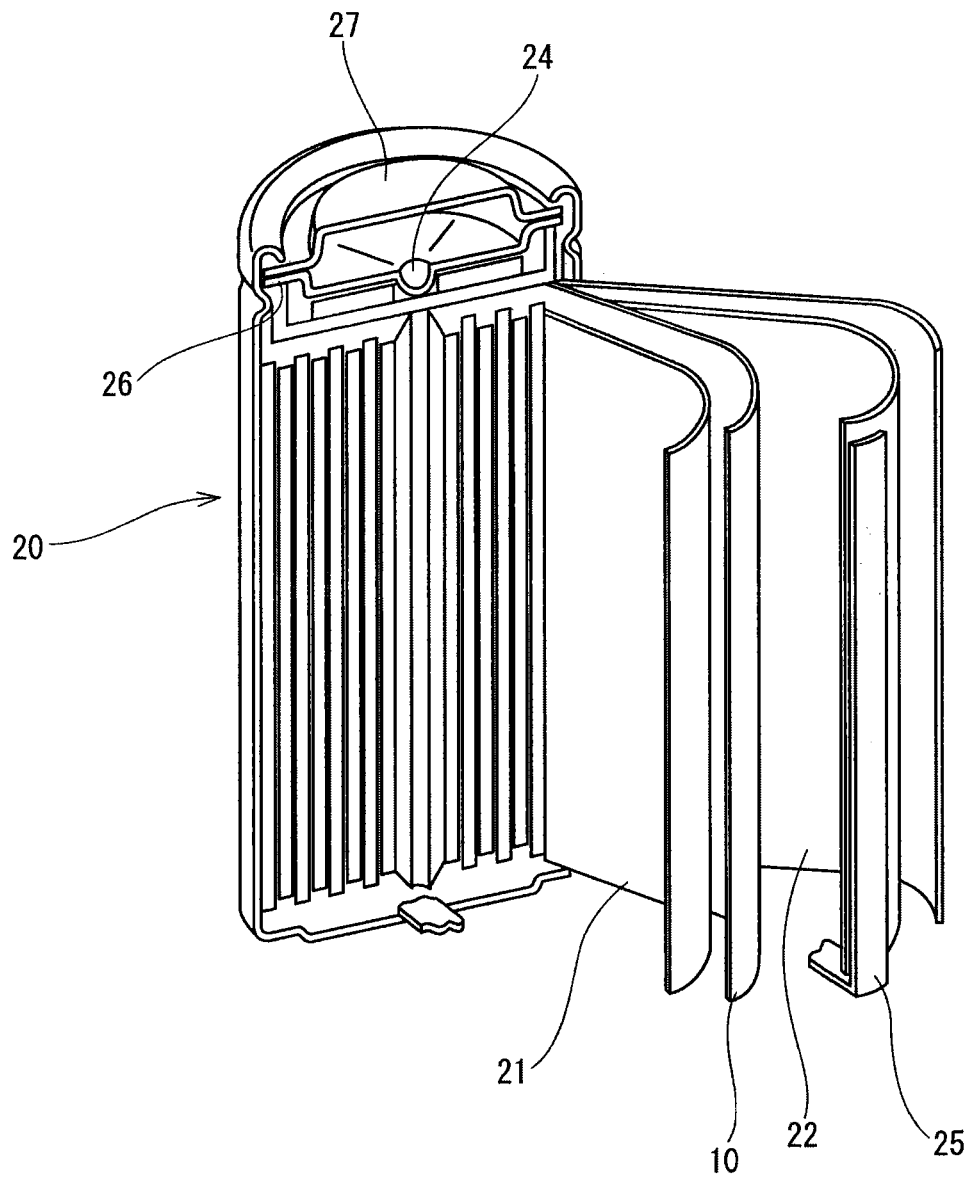
FIG. 1 is a schematic sectional view of a battery accommodating a porous polyolefin resin film of the present invention as a separator therefor.

The embodiments of the porous polyolefin resin film of the present invention are described in detail below.

In the present invention, unless specifically described, the expression of "main component" includes a meaning in which the porous polyolefin resin film may contain components other than the main component in a range where other components do not prevent the main component from normally functioning. Although the content rate of the main component is not specified, the expression of the "main component" also means that the main component is contained in the porous polyolefin resin film at not less than 50 mass %, favorably not less than 70 mass %, and especially favorably not less than 90 mass % (including 100%).

Unless otherwise described, the description of "X to Y" (X, Y are any numerals) is intended to mean "not less than X nor more than Y" and also includes the meaning "preferably, larger than X or "preferably, smaller than Y".

Each of components composing the porous polyolefin resin film of the present invention is described below.
(Porous Polyolefin Resin Film)

As a polyolefin resin for use in the porous polyolefin resin film, a homopolymer or a copolymer formed by polymerizing ethylene, propylene, 1-butene, 4-methyl-1-pentene or 1-hexane is listed. Of these homopolymers and the copolymers, polypropylene resin and polyethylene resin are preferable.
(Polypropylene Resin)

As the polypropylene resin, homopolypropylene (propylene homopolymer) and random copolymers or block copolymers each consisting of propylene and α-olefin such as ethylene, 1-butene, 1-pentene, 1-hexene, 1-heptene, 1-octene, 1-nonen or 1-decene are listed. It is necessary that the laminated porous film has a high mechanical strength and a high heat resistance. From this standpoint, the homopolypropylene can be used as the polypropylene resin more favorably than the above-described polypropylene resins.

It is favorable to use the polypropylene resin in which an isotactic pentad fraction showing tacticity is 80 to 99%. It is more favorable to use the polypropylene resin in which the isotactic structure pentad fraction is 83 to 98% and most favorable to use the polypropylene resin in which the isotactic structure pentad fraction at 85 to 97%. When the isotactic pentad fraction is too low, there is a fear that the mechanical strength of the laminated porous film is low. On the other hand, the upper limit of the isotactic pentad fraction is specified by an upper limit value industrially obtained at the present time. But in the case where a resin having a higher regularity at an industrial level is developed in the future, there is a possibility that the upper limit of the isotactic pentad fraction is altered.

The isotactic pentad fraction means a three-dimensional structure in which all of 5 methyl groups which are side chains branched from a main chain consisting of a carbon-carbon bond composed of arbitrary continuous 5 propylene units are positioned in the same direction or the ratio of the three-dimensional structure. The attribution of a signal in a methyl group region conforms to A. Zambelli et al. (Macromol. 8,687, (1975)).

It is favorable that Mw/Mn which is a parameter showing the molecular-weight distribution of the polypropylene resin is 2.0 to 10.0. It is more favorable to use the polypropylene resin having the Mw/Mn of 2.0 to 8.0 and most favorable to use the polypropylene resin having the Mw/Mn of 2.0 to 6.0. The smaller is the Mw/Mn, the narrower is the molecular-weight distribution. When the Mw/Mn is less than 2.0, there occurs a problem that extrusion moldability is low, and in addition it is difficult to industrially produce the polypropylene resin. On the other hand, when the Mw/Mn exceeds 10.0, the amount of a low molecular weight component becomes large. Thereby the mechanical strength of the laminated porous film is liable to be low. The Mw/Mn is obtained by a GPC (gel permeation chromatography) method.

Although the melt flow rate (MFR) of the polypropylene resin is not limited to a specific value, normally the MFR thereof is set to favorably 0.5 to 15 g/10 minutes and more favorably 1.0 to 10 g/10 minutes. By setting the MFR to not less than 0.5 g/10 minutes, the melt viscosity of the resin is high in molding the polypropylene resin into the film and thus a sufficient productivity can be securely obtained. By setting the MFR to not more than 15 g/10 minutes, it is possible to sufficiently hold the mechanical strength of the obtained porous polyolefin resin film. The MFR is measured in accordance with JIS K7210 in a condition where temperature is 230° C. and a load is 2.16 kg.

The method of producing the polypropylene resin is not limited to a specific one, but it is possible to exemplify known polymerization methods in which a known polymerization catalyst is used. For example, a multi-site catalyst represented by a Ziegler-Natta type catalyst and a single-site catalyst represented by a Metallocene catalyst are exemplified.

As the polypropylene resin, it is possible to use the following products commercially available: "Novatec PP" and "WINTEC" (produced by Japan Polypropylene Corporation), "Notio" and "TAFMER XR" (produced by Mitsui Chemicals, Inc.), "Zerasu" and "Thermorun" (produced by Mitsubishi Chemical Corporation), "Sumitomo NOBLEN" and "Toughseren" (produced by Sumitomo Chemical Co., Ltd.), "Prime TPO" (produced by Prime Polymer Corporation), "AdfleX", "Adsyl", and "HMS-PP (PF814)" (produced by SunAllomer Ltd.), and "Versify" and "Inspire" (produced by Dow Chemical Company). It is preferable that the polypropylene resin has a β crystal activity.

The β crystal activity can be considered as an index indicating that the polypropylene resin of a membrane material has generated a β crystal before the membrane material is stretched. When the polypropylene resin of the membrane material generates the β crystal before the membrane material is stretched, micropores are easily formed by stretching the membrane material. Thereby it is possible to obtain the porous polyolefin resin film having a high air-permeable characteristic.

Whether the porous polyolefin resin film of the present invention has the "β crystal activity" is determined according to whether a crystalline melting peak temperature derived from the β crystal is detected by using a differential scanning calorimeter and/or according to whether a diffraction peak derived from the β crystal is detected by measurement conducted with an X-ray diffraction measuring apparatus to be described later.

More specifically, after the temperature of the porous polyolefin resin film is raised from 25° C. to 240° C. at a heating speed of 10° C./minute, the porous polyolefin resin film is allowed to stand for one minute. After the temperature of the porous polyolefin resin film is dropped from 240° C. to 25° C. at a cooling speed of 10° C./minute, the porous polyolefin resin film is allowed to stand for one minute. Thereafter the temperature of the porous polyolefin resin film is raised again from 25° C. to 240° C. at the heating speed of 10° C./minute. In the case where a crystalline melting peak temperature (Trap) of the porous polyolefin resin film derived from the β crystal of the polypropylene resin is detected at this time, it is determined that the porous polyolefin resin film has the β crystal activity.

The degree of the β crystal activity of the porous polyolefin resin film is computed based on an equation shown below by using a detected crystalline melting heat amount ($\Delta Hm\alpha$) derived from an a crystal of the polypropylene resin and a detected crystalline melting heat amount ($\Delta Hm\beta$) derived from the β crystal thereof.

$$\beta \text{ crystal activity degree } (\%) = [\Delta Hm\beta/(\Delta Hm\beta + \Delta Hm\alpha)] \times 100$$

For example, in the case where the polypropylene resin is the homopolypropylene, the β crystal activity degree can be computed from the crystalline melting heat amount ($\Delta Hm\beta$), derived from the β crystal, which is detected mainly in a range not less than 145° C. and less than 160° C. and from the crystalline melting heat amount ($\Delta Hm\alpha$), derived from the α crystal, which is detected mainly in a range not less than 160° C. nor more than 170° C. in the case where the polypropylene resin is a random polypropylene in which 1 to 4 mold % of ethylene is copolymerized, the β crystal activity degree can be computed from the crystalline melting heat amount ($\Delta Hm\beta$), derived from the β crystal, which is detected mainly in a range not less than 120° C. and less than 140° C. and from the crystalline melting heat amount ($\Delta Hm\alpha$), derived from the α crystal, which is detected mainly in a range not less than 140° C. nor more than 165° C.

It is preferable that the porous polyolefin resin film has a possible highest β crystal activity degree. The β crystal activity degree is favorably not less than 20%, more favorably not less than 40%, and especially favorably not less than 60%. When the porous polyolefin resin film has the β crystal activity degree not less than 20%, it is possible to generate a large number of the β crystal of the polypropylene resin of the unstretched membrane material, and in addition, a large number of pores fine and homogeneous is formed by stretching the unstretched membrane material. Consequently it is possible to obtain a separator, for a lithium ion battery, which has a high mechanical strength and an excellent air-permeable performance.

Although the upper limit value of the β crystal activity degree is not limited to a specific value, the higher the β crystal activity degree is, the more effectively the above-described effect can be obtained. Therefore it is preferable that the upper limit of the β crystal activity degree is as close to 100% as possible.

Whether the porous polyolefin resin film has the β crystal activity can be also determined based on a diffraction profile to be obtained by conducting wide-angle X-ray diffraction measurement of the porous polyolefin resin film subjected to specific heat treatment.

In detail, after the porous polyolefin resin film is thermally treated at 170° C. to 190° C. higher than the melting point of the polypropylene resin, the porous polyolefin resin film in which the β crystal has been generated and grown is gradually cooled to carry out the wide-angle X-ray measurement of the porous polyolefin resin film. When a diffraction peak derived from a (300) plane of the β crystal of the polypropylene resin is detected in a range of $2\theta = 16.0°$ to $16.5°$, it is determined that the porous polyolefin resin film has the β crystal activity.

Regarding the detail of the β crystal structure of the polypropylene resin and the wide-angle X-ray diffraction thereof, it is possible to refer to Macromol. Chem. 187, 643-652 (1986), Prog. Polym. Sci. Vol. 16, 361-404 (1991), Macromol. Symp. 89, 499-511 (1995), Macromol. Chem. 75,134 (1964), and reference documents listed in these documents. The method of evaluating the β crystal activity by using the wide-angle X-ray diffraction is shown in detail in the examples of the present invention to be described later.

The β crystal activity can be measured in the case where the porous polyolefin resin film has a single-layer structure and in the case where the porous polyolefin resin film has a multi-layer structure in which other porous layers are laminated on the single layer.

As methods of obtaining the β crystal activity, the method of adding the polypropylene resin treated to generate the peroxide radical to the resin composition, as described in U.S. Pat. No. 3,739,481 and the method of adding a β crystal nucleating agent to the resin composition are exemplified.

(β Crystal Nucleating Agent)

As the β crystal nucleating agents to be used in the present invention, those shown below are listed. It is possible to use any β crystal nucleating agent which enhances the generation and growth of the β crystal of the polypropylene resin. The β crystal nucleating agent can be used by mixing not less than two kinds with each other.

As the β crystal nucleating agent, it is possible to list amide compounds; tetraoxaspiro compounds; quinacridones; iron oxides having a nano-scale size; alkaline metal salts or alkaline earth metal salts of carboxylic acids represented by 1,2-potassium hydroxystearate, magnesium benzoate, magnesium succinate, and magnesium phthalate; aromatic sulfonic acid compounds represented by sodium benzensulfonate and sodium naphthalene sulfonate; diesters or triesters of dibasic or tribasic carboxylic acids; phthalocyanine-based pigments represented by phthalocyanine blue; two-component compounds composed of a component A which is an organic dibasic acid and a component B which is an oxide, a hydroxide or a salt of one of the group IIA metals of the Periodic Table; and compositions consisting of a cyclic phosphorous compound and a magnesium compound. Other kinds of the β crystal nucleating agent are described in Japanese Patent Application Laid-Open Nos. 2003-306585, 06-289566, and 09-194650.

As products of the β crystal nucleating agent commercially available, "N Jester-NU-100" produced by New Japan Chemical Co., Ltd. is exemplified. As examples of the polypropylene resin to which the β crystal nucleating agent is added, it is possible to list Polypropylene "Bepol B-022SP" produced by Aristech Inc., Polypropylene "Beta (β)-PPBE60-7032" produced by Borealis Inc., and Polypropylene "BNX BETAPP-LN" produced by Mayzo Inc.

It is necessary to appropriately adjust the mixing ratio of the β crystal nucleating agent to be added to the polypropylene resin according to the kind of the β crystal nucleating agent and the composition of the polypropylene resin. It is favorable to add 0.0001 to 5.0 parts by mass of the β crystal nucleating agent, more favorable to add 0.001 to 3.0 parts by mass thereof, and most favorable to add 0.01 to 1.0 part by mass thereof to 100 parts by mass of the polypropylene resin. When the mixing ratio of the β crystal nucleating agent is not less than 0.0001 parts by mass, it is possible to generate and grow the β crystal of the polypropylene resin sufficiently at a production time and securely obtain a sufficient β crystal activity and a desired air-permeable characteristic in the case where the porous polyolefin resin film is used as the separator for the battery. When not more than 5.0 parts by mass of the β crystal nucleating agent is added to 100 parts by mass of the polypropylene resin, economic advantage can be obtained, and in addition, the β crystal nucleating agent is unlikely to bleed to the surface of the laminated porous film, which is preferable.

(Organic-Inorganic Hybrid Particles (f))

It is important that the porous polyolefin resin film of the present invention contains organic-inorganic hybrid particles (f).

The organic-inorganic hybrid particle (f) is a composite particles in which an organic polymer and an inorganic material are uniformly distributed and has wear-resistant and heat-resistant properties of the inorganic material and flexible property of the organic polymer.

Because the organic-inorganic hybrid particles (f) contained in the resin composition have a high affinity for the polyolefin resin, the organic-inorganic hybrid particles (f) have a high adhesiveness to the polyolefin resin. Thereby delamination is unlikely to occur at the interface between the polyolefin resin and the organic-inorganic hybrid particles (f). Therefore in the case where the porous polyolefin resin film is used as a separator for a nonaqueous electrolytic solution secondary battery, the battery is allowed to have excellent properties. In addition, because the organic-inorganic hybrid particles (f) agglomerate to each other to a low extent and have an excellent dispersibility, the pore-forming effect can be obtained by a smaller amount of addition of the organic-inorganic hybrid particles than the addition amount of inorganic particles or organic particles.

In the case where pores are formed in the porous polyolefin resin film by stretching it at a high enlargement ratio of area, it is possible to impart a high air-permeable characteristic to the porous polyolefin resin film because the porous polyolefin resin film contains the organic-inorganic hybrid particles (f). This is because the interface between the polyolefin resin and the organic-inorganic hybrid particles (f) serves as the starting point of pores, and the starting point is expanded by stretching the porous polyolefin resin film.

On the other hand, in a porous polyolefin resin film not containing the organic-inorganic hybrid particles (f), when the porous polyolefin resin film is stretched at a high enlargement ratio of area, formed pores are strained. Thus the pores become flat and are closed finally. This is because the air-permeable characteristic deteriorates owing to non-presence of the interface between the polyolefin resin and the organic-inorganic hybrid particles (f).

An organic silicon fine particle is exemplified as an example of the organic-inorganic hybrid particle (f). The organic silicon fine particle is described in detail below. The organic silicon fine particle consists of a polysiloxane crosslinked structure. The polysiloxane crosslinked structure consists of siloxane units forming a three-dimensional network structure. In the present invention, although the kind and rate of the siloxane unit composing the polysiloxane crosslinked structure are not specifically restricted, the polysiloxane crosslinked structure is composed of a siloxane unit shown by the following chemical formula 1, a siloxane unit shown by the following chemical formula 2, a siloxane unit shown by the following chemical formula 3, a siloxane unit shown by the following chemical formula 4, a siloxane unit shown by the following chemical formula 5, and a siloxane unit shown by the following chemical formula 6. It is preferable that the polysiloxane crosslinked structure satisfies the following conditions 1 through 3 all together.

$SiO_{4/2}$  (Chemical formula 1)

$Si(OH)O_{3/2}$  (Chemical formula 2)

$R^1(OH)O_{3/2}$  (Chemical formula 3)

$R^2(OH)O_{3/2}$  (Chemical formula 4)

$R^3Si(OH)O_{2/2}$  (Chemical formula 5)

$R^4Si(OH)O_{2/2}$  (Chemical formula 6)

In the chemical formulas 3 through 6, $R^1$, $R^3$: unreactive hydrocarbon group $R^2$, $R^4$: an organic group having a reactive group selected from among the family of the following reactive groups Family of reactive groups: an acryloxy group, a methacryloxy group, a vinyl group, and a mercapto group Condition 1: the siloxane unit shown by the chemical formula 1/(the siloxane unit shown by the chemical formula 2+the siloxane unit shown by the chemical formula 3+the siloxane unit shown by the chemical formula 4+the siloxane unit shown by the chemical formula 5+the siloxane unit shown by the chemical formula 6)=20/80 to 50/50 (molar ratio).

Condition 2: (the siloxane unit shown by the chemical formula 2+the siloxane unit shown by the chemical formula 3+the siloxane unit shown by the chemical formula 4)/(the siloxane unit shown by the chemical formula 5+the siloxane unit shown by the chemical formula 6)=50/50 to 75/25 (molar ratio).

Condition 3: (the siloxane unit shown by the chemical formula 3+the siloxane unit shown by the chemical formula 5)/(the siloxane unit shown by the chemical formula 4+the siloxane unit shown by the chemical formula 6)=20/80 to 60/40 (molar ratio).

The siloxane unit shown by the chemical formula 1 is an anhydrous silicic acid unit. The siloxane unit shown by the chemical formula 2 is hydroxy siloxane unit.

In the siloxane unit shown by the chemical formula 3, the reference symbol $R^1$ in the chemical formula 3 denotes an unreactive hydrocarbon group. As the unreactive hydrocarbon group, an alkyl group, a cycloalkyl group, an aryl group, an alkyl aryl group, and an aralkyl group are listed. Of these unreactive hydrocarbon groups, the alkyl group such as a methyl group, an ethyl group, and a propyl group whose carbon number is 1 to 3 is favorable. The methyl group is more favorable than the other alkyl groups. As the siloxane unit shown by the chemical formula 3, a methylsiloxane unit, an ethylsiloxane unit, and a propylsiloxane unit are listed. The methylsiloxane unit is preferable.

In the siloxane unit shown by the chemical formula 4, the reference symbol $R^2$ in the chemical formula 4 denotes an organic group having a specific reactive group. As the specific reactive group, an acryloxy group, a methacryloxy group, a vinyl group, and a mercapto group are listed. As the organic group having the specific reactive group, it is possible to list 1) an organic group such as a 2-acryloxyethyl group and a 3-acryloxypropyl group having the acryloxy group, 2) an organic group such as a 2-methacryloxyethyl group and a 3-methacryloxypropyl group having the methacryloxy group, 3) an organic group such as a vinyl group, an allyl group, an isopropenyl group, and a 2-methylallyl group having a vinyl group, and 4) an organic group such as a mercaptopropyl group and a mercaptoethyl group having the mercapto group. As the siloxane unit shown by the chemical formula 4, it is possible to list 1) a siloxane unit such as a 2-acryloxyethylsiloxane unit and a 3-acryloxypropylsiloxane unit having the acryloxy group, 2) a siloxane unit such as a 2-methacryloxyethylsiloxane unit and a 3-methacryloxypropylsiloxane unit having the methacryloxy group, 3) a siloxane unit such as a vinylsiloxane unit, an arylsiloxane unit, and an isopropenylsiloxane unit having the vinyl group, and 4) a siloxane unit such as a mercaptopropylsiloxane unit and a mercaptoethylsiloxane unit having the mercapto group. Of the above-described siloxane units, the siloxane unit having the acryloxy group and the siloxane unit having the methacryloxy group are preferable.

In the siloxane unit shown by the chemical formula 5, the reference symbol $R^3$ in the chemical formula 5 is the same as the content of the description made on the reference symbol $R^1$ in the chemical formula 3. As the siloxane unit shown by the chemical formula 5, a hydroxy=methylsiloxane unit, a hydroxy=ethylsiloxane unit, and a hydroxy=propylsiloxane unit are listed. The hydroxy=methylsiloxane unit is preferable.

In the siloxane unit shown by the chemical formula 6, the reference symbol $R^4$ in the chemical formula 6 is the same as the content of the description made on the reference symbol $R^2$ in the chemical formula 4. As the siloxane unit shown by the chemical formula 6, it is possible to list 1) a hydroxysiloxane unit such as a hydroxy=2-acryloxyethylsiloxane unit and a hydroxy=3-acryloxypropylsiloxane unit having the acryloxy group, 2) a hydroxysiloxane unit such as a hydroxy=2-methacryloxyethylsiloxane unit and a hydroxy=3-methacryloxypropylsiloxane unit having the methacryloxy group, 3) a hydroxysiloxane unit such as a hydroxy=vinylsiloxane unit, hydroxy=arylsiloxane unit, and a hydroxy=isopropenylsiloxane unit having the vinyl group, and 4) a hydroxysiloxane unit such as a hydroxy=mercaptopropylsiloxane unit and a hydroxy=mercaptoethylsiloxane unit having the mercapto group. Of the above-described siloxane units, the hydroxysiloxane units having the acryloxy group and the methacryloxy group are preferable.

In the case where the polysiloxane crosslinked structure is composed of the above-described siloxane units, the component rate of each of the siloxane units is so set as to satisfy the above-described conditions 1 through 3 all together. The condition 1 is that the siloxane unit shown by the chemical formula 1/(the siloxane unit shown by the chemical formula 2+the siloxane unit shown by the chemical formula 3+the siloxane unit shown by the chemical formula 4+the siloxane unit shown by the chemical formula 5+the siloxane unit shown by the chemical formula 6)=20/80 to 50/50 (molar ratio). The above-described ratio is preferably 25/75 to 45/55 (molar ratio). The condition 2 is that (the siloxane unit shown by the chemical formula 2+the siloxane unit shown by the chemical formula 3 the siloxane unit shown by the chemical formula 4)/(the siloxane unit shown by the chemical formula shown by the chemical formula 5+the siloxane unit shown by the chemical formula 6)=50/50 to 75/25 (molar ratio). The above-described ratio is preferably 60/40 to 70/30 (molar ratio). The condition 3 is that (the siloxane unit shown by the chemical formula 3+the siloxane unit shown by the chemical formula 5)/(the siloxane unit shown by the chemical formula 4+the siloxane unit shown by the chemical formula 6)=20/80 to 60/40 (molar ratio). The above-described ratio is preferably 25/75 to 45/55 (molar ratio).

The organic silicon fine particle of the present invention consists of the above-described polysiloxane crosslinked structure. The organic silicon fine particle is circular ring-shaped as a whole. The average of outer diameters of the organic silicon fine particles is 0.05 to 15 µm. The average of inner diameters of the organic silicon fine particles is 0.01 to 10 µm. The difference between the average of the outer diameters thereof and the average of the inner diameters thereof is in the range of 0.04 to 5 µm. It is preferable that the average of the outer diameters of the organic silicon fine particles is 0.1 to 8 µm, that the average of the inner diameters of the organic silicon fine particles is 0.05 to 6 µm, and that the difference between the average of the outer diameters thereof and the average of the inner diameters thereof is in the range of 0.5 to 3 µm. The organic silicon fine particles of the present invention were subjected to a scanning electron microscope to measure the outer and inner diameters of arbitrary 100 organic silicon fine particles extracted from secondary electron images. In this manner, the average of the outer diameters of the organic silicon fine particles of the present invention and that of the inner diameters thereof were determined.

The method of producing the organic silicon fine particle of the present invention is described below. The method of producing the organic silicon fine particle of the present invention is as described previously. That is, a silanol group-forming silicon compound shown by the following chemical formula 7, a silanol group-forming silicon compound shown by the following chemical formula 8, and a silanol group-forming silicon compound shown by the following chemical formula 9 are used at 25/75 to 60/40 (molar ratio) in the ratio of (the silanol group-forming silicon compound shown by the chemical formula 7/(the silanol group-forming silicon compound shown by the chemical formula 8+the silanol group-forming silicon compound shown by the chemical formula 9), and at 20/80 to 60/40 (molar ratio) in the ratio of the silanol group-forming silicon compound shown by the chemical formula 8/the silanol group-forming silicon compound shown by the chemical formula 9. These silanol group-forming silicon compounds are hydrolyzed by bringing them into contact with water in the presence of a catalyst to generate the silanol compound. Thereafter the silanol compound is subjected to a condensation reaction to generate the organic silicon fine particle composed of the polysiloxane crosslinked structure.

$$SiX_4 \quad \text{(Chemical Formula 7)}$$

$$R^5SiY_3 \quad \text{(Chemical Formula 8)}$$

$$R^6SiZ_3 \quad \text{(Chemical Formula 9)}$$

In the chemical formulas 7 through 9, $R^5$: an unreactive hydrocarbon group $R^6$: an organic group having a reactive group selected from among the family of the following reactive groups Family of reactive groups: the acryloxy group, the methacryloxy group, the vinyl group, and the mercapto group X, Y, Z: an alkoxy group whose carbon number is 1 through 4, an alkoxyethoxy group having the alkoxy group whose carbon number is 1 through 4, an acyloxy group whose carbon number is 2 through 4, an N,N-dialkylamino group having the alkyl group whose carbon number is 1 through 4, a hydroxy group, halogen atoms or hydrogen atom.

The silanol group-forming silicon compound shown by the chemical formula 7 is a compound for forming the siloxane unit shown by the chemical formula 1 and a compound for forming the siloxane, unit shown by the chemical formula 2. The reference symbol X shown in the chemical formula 7 is 1) the alkoxy group such as a methoxy group and an ethoxy group whose carbon number is 1 to 4, 2) the alkoxyethoxy group such as a methoxyethoxy group and a butoxyethoxy group having the alkoxy group whose carbon number is 1 to 4, 3) the acyloxy group such as an acetoxy group and a propioxy group whose carbon number is 2 to 4, 4) the N,N-dialkylamino group such as a dimethylamino group and a diethylamino group whose carbon number is 1 to 4, 5) the hydroxyl group, and 6) halogen atoms such as a chlorine atom, a bromine atom or 7) a hydrogen atom.

As the silanol group-forming silicon compound shown by the chemical formula 7, it is possible to list tetramethoxysilane, tetraethoxysilane, tetrabutoxysilane, trimethoxyethoxysilane, tributoxyethoxysilane, tetraacetoxy silane, tetrapropioxy silane, tetra(dimethylamino)silane, tetra (diethylamino)silane, silane tetraol, chlorosilane triol, dichlorodisilanol, tetrachlorosilane, and chlorotrihydrogen silane. Of these silanol group-forming silicon compounds, the tetramethoxysilane, the tetraethoxysilane, the tetrabutoxysilane, and the tetrapropioxy silane are preferable.

The silanol group-forming silicon compound shown by the chemical formula 8 is a compound which forms the siloxane unit shown by the chemical formula 3 and a compound which forms the siloxane unit shown by the chemical formula 5. The reference symbol $R^5$ in the chemical formula 8 is the same as the content of the description made on the reference symbol $R^1$ in the chemical formula 3. The reference symbol Y in the chemical formula 8 is the same as the content of the description made on the reference symbol X in the chemical formula 7.

methylchlorodisilanol, methyltrichlorosilane, and methyltrihydrogen silane As the silanol group-forming silicon compound shown by the chemical formula 8, it is possible to list methyltrimethoxysilane, ethyltrimethoxysilane, propyltributoxy silane, butyltributoxysilane, phenyltrimethoxyexthoxysilane, methyltributoxysilane, methyltriacetoxysilane, methyltripropioxy silane, methyltriacetoxysilane, methyltri (dimethylamino)silane, methyltri(diethylamino)silane, methylsilanetriol, methylchlorodisilanol, methyltrichlorosilane, and methyltrihydrogen silane. Of the above-described silanol group-forming silicon compounds, as described above on the reference symbol $R^1$ in the chemical formula 3, the silanol group-forming silicon compound which forms the methylsiloxane unit is preferable.

As described above on the reference symbol $R^3$ in the chemical formula 5, the silanol group-forming silicon compound which forms the hydroxy=methylsiloxane unit is preferable.

The silanol group-forming silicon compound shown by the chemical formula 9 is a compound which forms the siloxane unit shown by the chemical formulas 4 and 6. The reference symbol $R^6$ in the chemical formula 9 is the same as the content of the description made on the reference symbol $R^2$ in the chemical formula 4. The reference symbol Z in the chemical formula 9 is the same as the content of the description made on the reference symbol X in the chemical formula 7.

As the silanol group-forming silicon compound shown by the chemical formula 9, it is possible to list 1) a silane compound such as 2-acryloxyethyltrimethoxysilane and 3-acryloxypropyltrimethoxysilane having the acryloxy group, 2) a silane compound such as 2-methacryloxyethyltrimethoxysilane and 3-methacryloxypropyltrimethoxysilane having the methacryloxy group, 3) a silane compound such as vinyltrimethoxysilane, aryltrimethoxysilane, and isopropenyltrimethoxy silane having the vinyl group, and 4) a silane compound such as mercaptopropyltrimethoxysilane and mercaptoethyltrimethoxysilane having the mercapto group. Of the above-described silanol group-forming silicon compounds, the silane compounds having the acryloxy group and the methacryloxy group are preferable.

As the organic-inorganic hybrid particle (f), it is possible to use commercially available products "SPT013" and "SPT014" (commercial name, produced by TAKEMOTO OIL AND FAT CO., LTD.).

The average particle diameter of the organic-inorganic hybrid particles (f) is favorably not less than 0.01 µm and more favorably not less than 0.1 µm. Regarding the upper limit of the average particle diameter thereof, the average particle diameter thereof is favorably not more than 10 µm and more favorably not more than 5.0 µm. From the standpoint of the dispersibility of the organic-inorganic hybrid particles (f), it is preferable to set the average particle diameter thereof to not less than 0.01µm. It is unpreferable to set the average particle diameter thereof to not less than 10.0 µm because when the film is stretched, the diameters of pores are so large that pin holes are formed and the mechanical strength of the film deteriorates.

"Average particle diameter" described in this embodiment means a value measured in accordance with a method using SEM.

It is preferable to set the addition amount of the organic-inorganic hybrid particle (f) to be added to 100 mass % of the polyolefin resin to not more than 10 mass %. By setting the addition amount of the organic-inorganic hybrid particle (f) to not more than 10 mass %, the porous polyolefin resin film of the present invention is capable of sufficiently securing its mechanical strength. Thus the particles are unlikely to drop, which sufficiently restrains the porous polyolefin resin film from being contaminated.

On the other hand, the lower limit of the addition amount of the organic-inorganic hybrid particle (f) to be added to the polyolefin resin is not set to a specific amount. The amount thereof to be added to 100 mass % of the polyolefin resin is set to favorably not less than 1 mass % and more favorably not less than 3 mass %. By setting the addition amount thereof to not less than 1 mass %, the porous polyolefin resin film of the present invention is capable of obtaining an air-permeable characteristic sufficiently higher than a porous polyolefin resin film to which the organic-inorganic hybrid particles (f) is not added, which is preferable.

(Other Components)

In the present invention, in addition to the above-described components, additives to be normally to be added to the resin composition may be appropriately added to the polypropylene resin in a range in which they do not outstandingly inhibit the properties of the effect of the present invention. The additives are added to the polypropylene resin to improve and adjust molding processability, productivity, and various properties of the laminated porous film. It is possible to list recycle resin which is generated from trimming loss such as a lug, inorganic particle such as silica, talc, kaolin, calcium carbonate, and the like, pigments such as titanium oxide, carbon black, and the like, a flame retardant, a weathering stabilizer, a heat stabilizer, an antistatic agent, a melt viscosity improving agent, a crosslinking agent, a lubricant, a nucleating agent, plasticizer, an age resistor, an antioxidant, a light stabilizer, an ultraviolet ray absorber, a neutralizing agent, an antifog agent, an anti-blocking agent, a slip agent, and a coloring agent. More specifically, the antioxidant described on pages 154 through 158 of "Plastic compounding agent", the ultraviolet absorbing agent described on pages 178 through 182 thereof, the surface-active agent serving as the antistatic agent described on pages 271 through 275 thereof, and the lubricant described on pages 283 through 294 thereof are listed.

It is preferable to add a low molecular weight compound to the polyolefin resin from the standpoint of the appearance of the air-permeable characteristic. As the low molecular weight compound, low molecular weight polypropylene, low molecular weight polyethylene, low molecular weight polystyrene, saturated alicyclic hydrocarbon resin, wax, and modified substances thereof are listed. A proper low molecular weight compound can be selected according to the selection of the kind of the polyolefin resin of the present invention. For example, in the case where the polypropylene resin is selected as the polyolefin resin, the low molecular weight polypropylene is preferable as the low molecular weight compound. The porous polyolefin resin film may contain one kind or a plurality of kinds of these low molecular weight compounds.

The weight-average molecular weight of the low molecular weight compound is not limited to a specific one, but is favorably 1000 to 100000, more favorably 3000 to 80000, and most favorably 5000 to 50000. By setting the weight-average molecular weight to not less than 1000, it is possible to sufficiently restrain bleed-out in the porous film. By setting the weight-average molecular weight to not more than 100000, it is possible to sufficiently improve the air-permeable characteristic of the porous film.

The porous film of the present invention may contain other thermoplastic resin in a range where the property thereof is not inhibited. Although the thermoplastic resin is not limited to a specific one, the following thermoplastic resins are listed: styrene resin such as styrene, AS resin, and ABS resin; ester resin such as polyvinyl chloride, fluororesin, polyethylene terephthalate, polybutylene terephthalate, polycarbonate, and polyarylate; ether resin such as polyacetal, polyphenylene ether, polysulfone, polyether sulfone, polyether ether ketone, polyphenylene sulfide; and polyamide resin such as nylon 6, nylon 6-6, and nylon 6-12; and ionomer.

(Layer Structure of Porous Polyolefin Resin Film)

The layer structure of the porous polyolefin resin film of the present invention may be composed of a single layer or a plurality of layers laminated one upon another, but it is preferable to compose the porous polyolefin resin film of not less than two layers.

The layer structure of the porous polyolefin resin film of the present invention is not limited to a specific one so long as the porous polyolefin resin film has at least one layer (layer A) consisting of a resin composition (a) containing the polyolefin resin as its main component. Other layers (layer B) can be laminated on the layer A in a range in which the lamination of the layer B on the layer A does not prevent the porous polyolefin resin film from normally functioning. It is possible to exemplify a structure in which a strength-holding layer, a heat-resistant layer (resin layer having high melting temperature) or a shut-down layer (resin layer having low melting temperature) is laminated on the layer A. In the case where the porous polyolefin resin film is used as the separator for the nonaqueous electrolytic solution secondary battery, it is preferable to laminate a resin layer having a low melting point in which pores close in a high-temperature atmosphere, thus securing the safety of the battery, as described in Japanese Patent Application Laid-Open No. 04-181651.

It is favorable to compose the layer structure of the porous polyolefin resin film by laminating the layer (layer A) consisting of the resin composition (a) containing the polyolefin resin as its main component and the layer B consisting of a resin composition (b) having a crystalline melting peak temperature lower than that of the resin composition (a) one upon another. It is more favorable to compose the layer structure of the porous polyolefin resin film by laminating a layer, consisting of a resin composition containing the polypropylene resin as its main component, which serves as the resin composition (a) and a layer, consisting of a resin composition containing polyethylene resin as its main component, which serves as the resin composition (b) one upon another. By laminating the layer consisting of the resin composition (b) on the layer consisting of the resin composition (a), it is possible to impart a shut-down property (SD property) to the porous polyolefin resin film in the case where the porous polyolefin resin film is used as the separator for the nonaqueous electrolytic solution secondary battery.

It is possible to exemplify a two-layer structure composed of the layer A/the layer B laminated one upon another and a three-layer structure composed of the layer A/the layer B/the layer A laminated one upon another or a structure composed of the layer B/the layer A/the layer B laminated one upon another. It is also possible to form a three-kind three-layer mode composed of the layers A and B and a third layer, having other functions, which is combined with the layers A and B. In this structure, the order in which the layers A and B and the third layer are laminated one upon another is not considered. It is also possible to increase the number of layers to four layers, 5 layers, six layers or seven layers as necessary.

The property of the porous polyolefin resin film of the present invention can be freely adjusted according to a layer structure, a lamination ratio, the composition of each layer, and a production method.

The polyethylene resin more favorable than other resins as the resin composition (b) having a crystalline melting peak temperature lower than that of the resin composition (a) is described below.

(Polyethylene Resin)

As the polyethylene resin, it is possible to list homopolymer polyethylene such as ultra-low-density polyethylene, low-density polyethylene, high-density polyethylene, linear low-density polyethylene, and ultra-high-molecular-weight polyethylene characteristic in its molecular weight and in addition, an ethylene-propylene copolymer, and copolymer polyethylene of the polyethylene resin and other polyolefin resins. Of these polyethylene resins, the homopolymer polyethylene and the copolymer polyethylene containing not more than 2 mol % of an α-olefin comonomer are favorable. The homopolymer polyethylene is more favorable. The kind of the α-olefin comonomer is not limited to a specific one.

The density of the polyethylene resin is set to favorably 0.910 to 0.970 g/cm$^3$, more favorably 0.930 to 0.970 g/cm$^3$, and most favorably 0.940 to 0.970 g/cm$^3$. When the density thereof is not less than 0.910 g/cm$^3$, the obtained porous polyolefin resin film is allowed to have a proper SD property, which is preferable. When the density thereof is not more than 0.970 g/cm$^3$, the polyethylene resin is capable of having a proper SD property, and in addition, the stretch property thereof is maintained, which is preferable. The density thereof can be measured in accordance with JIS K7112 by using a density gradient tube method.

Although the melt flow rate (MFR) of the polyethylene resin is not specifically limited, MFR thereof is favorably 0.03 to 30 g/10 minutes and more favorably 0.3 to 10 g/10 minutes. When the MFR is not less than 0.03 g/10 minutes, the melt viscosity of the resin is sufficiently low at a molding processing time, and thus the productivity is excellent, which is preferable. On the other hand, when the MFR is not more than 30 g/10 minutes, the obtained porous polyolefin resin film is allowed to obtain a sufficient mechanical strength, which is preferable.

The MFR is measured in accordance with JIS K7210 in the condition where temperature is 190° C. and a load is 2.16 kg.

The catalyst for polymerizing the polyethylene resin is not limited to a specific kind, but it is possible to use any of a Ziegler-Natta type catalyst, a Phillips type catalyst, and a Kaminski type catalyst. As methods of polymerizing the polyethylene resin, it is possible to use one-step polymerization, two-step polymerization, and multi-step polymerization. It is possible to use the polyethylene resin formed by any of the above-described methods.

(Porousness Acceleration Compound)

It is preferable to add a porousness acceleration compound X which accelerates porousness to the polyethylene resin. By adding the porousness acceleration compound X to the polyethylene resin, it is possible to effectively obtain a porous structure and easily control the configuration and diameter of micropores.

The kind of the porousness acceleration compound X is not limited to specific kinds. Modified polyolefin resin, alicyclic saturated hydrocarbon resin, modified substances thereof, an ethylene copolymer, and wax are exemplified. It is favorable that the polyethylene resin contains at least one kind selected from among the above-described porousness acceleration compounds X. Of these porousness acceleration compounds X, the alicyclic saturated hydrocarbon resin, the modified substances thereof, the ethylene copolymer, and the wax having a high effect for achieving porousness are favorable. The wax is more favorable from the standpoint of moldability.

As the alicyclic saturated hydrocarbon resin and the modified substances thereof, petroleum resin, rosin resin, terpene resin, coumarone resin, indene resin, coumarone-indene resin, and modified substances thereof are listed.

In the present invention, the petroleum resin means aliphatic, aromatic, and copolymerization petroleum resins to be obtained by homo-polymerization or copolymerization of one or not less than two kinds of compounds contained in aliphatic olefins and diolefins having C4 to C10 and aromatic compounds having not less than C8 and olefinic unsaturated bonds to be obtained from side products resulting from thermal decomposition of naphtha.

The petroleum resin includes aliphatic petroleum resin whose main raw material is C5 fraction, aromatic petroleum resin whose main raw material is C9 fraction, copolymerization petroleum resin of the aliphatic petroleum resin or the aromatic petroleum resin, and alicyclic petroleum resin. As the terpene resin, it is possible to exemplify terpene resin and terpene-phenol resin to be obtained from β-pinene. As the rosin resin, it is possible to exemplify rosin resin such as gum rosin, wood rosin, and the like and esterified rosin resin modified with glycerin or pentaerythritol. When the alicyclic saturated hydrocarbon resin and modified substances thereof are mixed with the polyethylene resin, they show a comparatively favorable compatibility with the polyethylene resin. The petroleum resin is more favorable from the standpoint of color and thermal stability. To use the hydrogenated petroleum resin is more favorable.

The hydrogenated petroleum resin is obtained by hydrogenating the petroleum resin by conventional methods. For example, hydrogenated aliphatic petroleum resin, hydrogenated aromatic petroleum resin, hydrogenated copolymerization petroleum resin, hydrogenated alicyclic petroleum resin, and hydrogenated terpene resin are listed. Of the hydrogenated petroleum resin, the hydrogenated alicyclic petroleum resin obtained by copolymerizing a cyclopentadiene compound and an aromatic vinyl compound with each other is especially preferable. As the hydrogenated petroleum resin commercially available, "Archon" (produced by Arakawa Chemical Industries, Ltd.) is exemplified.

In the present invention, the ethylene copolymer means a compound obtained by copolymerizing ethylene with not less than one kind selected from among vinyl acetate, unsaturated carboxylic acid, unsaturated carboxylic acid anhydride or carboxylate.

In the ethylene copolymer, the content rate of an ethylene monomer unit is favorably not less than 50 parts by mass, more favorably not less than 60 parts by mass, and most favorably not less than 65 parts by mass. The upper limit of the content rate of the ethylene monomer unit is favorably not more than 95 parts by mass, more favorably not more than 90 parts by mass, and most favorably not more than 85 parts by mass. When the content rate of the ethylene monomer unit is within the predetermined range, it is possible to form the porous structure more efficiently.

The ethylene copolymer having the MFR (JIS K7210, temperature: 190° C., load: 2.16 kg) not less than 0.1 g/10 minutes nor more than 10 g/10 minutes is preferably used. When the MFR is not less than 0.1 g/10 minutes, extrusion processability can be favorably maintained. On the other hand, when the MFR is not more than 10 g/10 minutes, the strength of the film is unlikely to deteriorate, which is preferable.

The ethylene copolymers shown below can be commercially obtained. As an ethylene-vinyl acetate copolymer, "EVAFLEX" (produced by Dupont-Mitsui Polychemicals Co., Ltd.) and "Novatec EVA" (produced by Japan Polyethylene Corporation) are exemplified. As an ethylene-acrylic acid copolymer, "NUC copolymer" (produced by Nippon Unicar Co., Ltd.), "EVAFLEX-EAA" (produced by Dupont-Mitsui Polychemicals Co., Ltd.), "REXPEARL EAA" (produced by Japan Ethylene Corporation) are exemplified. As an ethylene-(metha)acrylic acid copolymer, "ELVALOY" (produced by Dupont-Mitsui Polychemicals Co., Ltd.) and "REXPEARLE MA" (produced by Japan Ethylene Corporation) are exemplified. As an ethylene-ethyl acrylate copolymer, "REXPEARL EEA" (produced by Japan Ethylene Corporation) is exemplified. As an ethylene-methyl(metha)

acrylate copolymer, "Acryft" (produced by Sumitomo Chemical Co., Ltd.) is exemplified. As an ethylene-vinyl acetate-maleic anhydride terpolymer, "Bondine" (produced by Sumitomo Chemical Co., Ltd.) is exemplified. As an ethylene-glycidyl methacrylate copolymer, an ethylene-vinyl acetate-glycidyl methacrylate terpolymer, and an ethyl-ethyl acrylate-glycidyl methacrylate terpolymer, "Bondfast" (produced by Sumitomo Chemical Co., Ltd.) are exemplified.

In the present invention, the wax is an organic compound satisfying the properties of the following (a) and (b).

(a) Melting point thereof is 40° C. to 200° C.

(b) Melt viscosity thereof at temperatures higher than the melting point thereof by 10° C. is not more than 50 Pa·s.

The wax includes polar wax or nonpolar wax, polypropylene wax, polyethylene wax, and wax modifier. More specifically, it is possible to list the polar wax, the nonpolar wax, Fischer-Tropsh wax, oxidized Fischer-Tropsh wax, hydroxysteroid wax, functionalized wax, the polypropylene wax, the polyethylene wax, the wax modifier, amorphous wax, carnauba wax, caster oil wax, microcrystalline wax, beeswax, castor wax, vegetable wax, candelilla wax, Japan wax, ouricury wax, Douglas-fir Bark wax, rice bran wax, jojoba wax, bayberry wax, montan wax, ozokerite wax, ceresin wax, petroleum wax, paraffin wax, chemically modified hydrocarbon wax, substituted amide wax, combinations of these waxes, and derivatives thereof. Of these waxes, the paraffin wax, the polypropylene wax, the polyethylene wax, and the microcrystalline wax are favorable because these waxes allow the porous structure to be formed efficiently. As the polypropylene wax commercially available, "Mitsui Hi-WAX" (produced by Mitsui Chemicals, Inc.), "Bischol" produced by Sanyo Chemical Co., Ltd., "Licocene" produced by Clariant (Japan) K.K. are listed. the polyethylene wax commercially available, "FT-115" (produced by Nippon Seiro Co., Ltd.) is exemplified. As the microcrystalline wax commercially available, "Hi-Mic" (produced by Nippon Seiro Co., Ltd.) is exemplified.

In forming micropores by peeling the interface of the polyethylene resin and the porousness acceleration compound X, the lower limit of the mixing amount of the porousness acceleration compound X for 100 parts by mass of the polyethylene resin contained in one layer is favorably not less than 1 part by mass, more favorably not less than 5 parts by mass, and most favorably not less than 10 parts by mass. On the other hand, as the upper limit of the mixing amount of the porousness acceleration compound X, the mixing amount thereof is favorably not more than 50 parts by mass, more favorably not more than 40 parts by mass, and most favorably not more than 30 parts by mass. By setting the mixing amount of the porousness acceleration compound X for 100 parts by mass of the polyethylene resin to not less than 1 part by mass, it is possible to obtain a sufficient effect of generating an intended favorable porous structure. By setting the mixing amount of the porousness acceleration compound X for 100 parts by mass of the polyethylene resin to not more than 50 parts by mass, it is possible to secure a more stable moldability.

In addition to the polyethylene resin and the porousness acceleration compound X, as necessary, thermoplastic resin may be used in a range where the thermal property of the porous film, specifically, porousness is not inhibited. As other thermoplastic resins which can be mixed with the polyethylene resin, styrene resin such as styrene, AS resin, and ABS resin; ester resin such as polyvinyl chloride, fluororesin, polyethylene terephthalate, polybutylene terephthalate, polycarbonate, and polyarylate; ether resin such as polyacetal, polyphenylene ether, polysulfone, polyether sulfone, polyether ether ketone, and polyphenylene sulfide; and polyamide resin such as nylon 6, nylon 6-6, and nylon 6-12 are listed.

A rubber component such as a thermoplastic elastomer may be added to the polyethylene resin as necessary. As the thermoplastic elastomer, styrene butadiene elastomer, polyolefin elastomer, urethane elastomer, polyester elastomer, polyamide elastomer, 1,2-polybutadiene elastomer, polyvinyl chloride elastomer, and ionomer elastomer are listed.

In addition to the polyethylene resin and the porousness acceleration compound X, the resin composition may contain additives or other components to be normally contained therein. The additives are added to the polyethylene resin to improve and adjust molding processability, productivity, and various properties of the laminated porous film. It is possible to list recycle resin generated from trimming loss such as a lug, inorganic particles such as silica, talc, kaolin, calcium carbonate, and the like, pigments such as titanium oxide, carbon black, and the like, a flame retardant, a weathering stabilizer, a heat stabilizer, an antistatic agent, a melt viscosity improving agent, a crosslinking agent, a lubricant, a nucleating agent, a plasticizer, an age resistor, an antioxidant, a light stabilizer, an ultraviolet ray absorber, a neutralizing agent, an antifog agent, an anti-blocking agent, a slip agent, and a coloring agent.

Of the above-described additives, the nucleating agent is preferable because it has the effect of controlling the crystal structure of the polyethylene resin and making the porous structure fine when the unporous membrane material is stretched to form micropores therein. As examples of the nucleating agent commercially available, "Gelall D" (produced by New Japan Science Ltd.), "ADEKA STAB" (produced by Asahi Denka Co., Ltd.), "Hyperform" (produced by Milliken & Company), and "IRGACLEAR D" (produced by Chiba Specialty Chemicals, Inc.) are listed. As an example of the polyethylene resin to which the nucleating agent has been added, "Rikemaster" (produced by Riken Vitamin Co., Ltd.) is commercially available.

(Method of Producing Porous Polyolefin Resin Film)

The method of producing the porous polyolefin resin film of the present invention is described below. The present invention is not limited to the porous film to be produced by the production method described below.

The method of producing the unporous membrane material is not limited to a specific method, but known methods may be used. It is possible to exemplify a method of melting the thermoplastic resin composition by using an extruder, extruding it from a T-die, and cooling it with a casting roll to solidify it. It is also possible to use a method of cutting open a membrane material produced by using a tubular method to make it planar.

The method of stretching the unporous membrane material includes a roll stretching method, a rolling method, a tenter stretching method, and a simultaneous biaxial stretching method. Uniaxial stretching or biaxial stretching is performed by using one of the above-described methods or in combination of not less than two of the above-described methods. From the standpoint of the control of the porous structure, sequential biaxial stretching is preferable.

In the present invention, in the case where the porous polyolefin resin film is composed of a plurality of layers laminated one upon another, the method of producing the porous polyolefin resin film is classified into the following four according to the order of the step at which the unporous membrane material is made porous and the step at which layers are laminated one upon another.

(I) A method of making respective layers porous and thereafter laminating the layers which have been made porous one upon another or by using an adhesive agent or the like.

(II) A method of forming a laminated unporous membrane material by laminating respective layers one upon another and thereafter making the unporous membrane material porous.

(III) A method of making one of layers porous, laminating the layer which has been made porous and the other layer one upon another, and making the other layer porous.

(IV) A method of forming porous layers and thereafter laminating the formed porous layers one upon another by applying inorganic or organic particles thereto or by evaporating metal particles thereto to form a laminated porous film.

In the present invention, it is preferable to use the method (II) from the standpoint of the simplicity of its process and productivity. To secure the adhesion between two layers, it is especially preferable to form the laminated unporous membrane material by co-extrusion and thereafter make it porous.

The production method is described in detail below.

Initially a mixed resin composition of the polypropylene resin, the thermoplastic resin, and additives is prepared. The thermoplastic resin and the additives are used as necessary. Preferably, materials such as the polypropylene resin, the β nucleating agent, the organic-inorganic hybrid particles, and the additives to be used as desired are mixed with one another by using a Henschel mixer, a super mixer or a tumbler-type mixer. Alternatively all the components are put in a bag and mixed with one another by hand. After the components are melted and kneaded with a uniaxial extruder, preferably a twin screw extruder or a kneader, a mixture is cut to obtain a pellet.

The pellet is supplied to the extruder and extruded from an extrusion mouthpiece of a T-die to form a membrane material.

The kind of the T-die is not limited to a specific one. When a two-kind three-layer structure is adopted for the laminated porous film of the present invention, it is possible to use both a multi-manifold type for the two-kind three-layer structure and a feed block type for the two-kind three-layer structure.

Although the gap in the T-die to be used is determined according to an ultimately necessary thickness of the film, a stretching condition, a draft ratio, and various conditions, the gap in the T-die is normally 0.1 to 3.0 mm and favorably 0.5 to 1.0 mm. It is unpreferable to set the gap in the T-die to less than 0.1 mm from the standpoint of a production speed. When the gap in the T-die is more than 3.0 mm, the draft ratio becomes large, which is unpreferable from the standpoint of stability in the production of the film.

Although the extrusion processing temperature in the extrusion molding is appropriately adjusted according to the flow property of the resin composition and the moldability thereof, the extrusion processing temperature is set to favorably 180 to 350° C., more favorably 200 to 330° C., and most favorably 220 to 300° C. When the extrusion processing temperature is not less than 180° C., the fused resin has a sufficiently low viscosity and thus an excellent moldability and an improved productivity. On the other hand, by setting the extrusion processing temperature to not more than 350° C., it is possible to restrain the resin composition from deteriorating and thus the mechanical strength of the porous polyolefin-resin film to be obtained from lowering.

The temperature at which the resin composition is cooled to solidify it by using the casting roll is very important in the present invention. The ratio of the β crystal of the polyolefin resin contained in the membrane material can be adjusted in dependence on temperature. The temperature at which the resin composition is cooled to solidify it by using the casting roll is set to favorably 80 to 150° C., more favorably 90 to 140° C., and most favorably 100 to 130° C. By setting the temperature at which the resin composition is cooled to solidify it to not less than 80° C., the ratio of the β crystal contained in the membrane material can be sufficiently increased, which is preferable. By setting the temperature at which the resin composition is cooled to solidify it to not more than 150° C., it is possible to restrain the occurrence of a trouble that extruded molten resin adheres to the casting roll and sticks thereto. Thus it is possible to efficiently process the resin composition into the membrane material, which is preferable.

By setting the temperature of the casting roll to the above-described temperature range, the ratio of the β crystal of the polyolefin resin of the unstretched membrane material is set to 30 to 100%, favorably to 40 to 100%, more favorably to 50 to 100%, and especially favorably to 60 to 100%. By setting the ratio of the β crystal of the unstretched membrane material to not less than 30%, it is easy to make the unstretched membrane material porous by a stretching operation to be performed at a later step. Thereby it is possible to obtain the porous polyolefin resin film having an excellent air-permeable property.

By using the differential scanning calorimeter, the rate of the β crystal of the polyolefin resin of the unstretched membrane material is computed based on the following equation by using the detected crystal melting heat amount ($\Delta Hm\alpha$) derived from the α crystal of the polyolefin resin (A) and the crystal melting heat amount ($\Delta Hm\beta$) derived from the β crystal thereof, when the temperature of the membrane material is raised from 25° C. to 240° C. at a heating speed of 10° C./minute.

$$\text{Rate (\%) of }\beta\text{ crystal} = [\beta Hm\beta/(\Delta Hm\beta + \Delta Hm\alpha)] \times 100$$

At the stretching step, the unporous membrane material may be uniaxially or biaxially stretched in the length direction thereof or in the width direction thereof. In biaxially stretching the unporous membrane material, simultaneous biaxial stretching or sequential biaxial stretching may be performed. In forming the porous polyolefin resin film of the present invention, the sequential biaxial stretching is more favorable than the simultaneous biaxial stretching because the sequential biaxial stretching allows a stretching condition to be selected at each stretching step and the porous structure to be easily controlled.

It is more favorable to stretch the obtained unporous membrane material at least biaxially thereafter. In biaxially stretching the unporous membrane material, the simultaneous biaxial stretching or the sequential biaxial stretching may be performed. But the sequential biaxial stretching is more favorable than the simultaneous biaxial stretching because the sequential biaxial stretching allows stretching conditions (stretch ratio, temperature) to be easily selected at each stretching step and the porous structure to be easily controlled. The longitudinal direction of the membrane material and that of the film are called a "length direction", whereas a direction vertical to the length direction is called a "width direction". Stretching in the longitudinal direction is called "stretching in length-direction", whereas stretching in the direction vertical to the length direction is called "stretching in width direction".

In the case where the sequential biaxial stretching is used, it is preferable to select a stretching temperature within the range of conditions shown below, although it is necessary to appropriately select the stretching temperature according to the composition of the resin composition to be used and a crystallized form.

In the case where the sequential biaxial stretching is used, it is necessary to vary the stretching temperature according to the composition, crystal melting peak temperature, and crystallization degree of the resin composition to be used. The stretching temperature in the stretching in the length direction is controlled in the range of favorably 0 to 130° C., more favorably 10 to 120° C., and most favorably 20 to 110° C. The stretch ratio in the length direction is set to favorably 2 to 10 times, more favorably 3 to 8 times, and most favorably 4 to 7 times longer than the original length of the unporous membrane material. By the stretching the unporous membrane material in the length direction within the above-described range, it is possible to restrain breakage at a stretching time and generate a proper starting point of pores.

On the other hand, the stretching temperature in the stretching in the width direction is set to 100 to 160° C., favorably 110 to 150° C., and most favorably 120 to 140° C. The stretch ratio in the width direction is set to favorably 1.2 to 10 times, more favorably 1.5 to 8 times, and most favorably 2 to 7 times longer than the original length of the unporous membrane material. By stretching the unporous membrane material in the width direction in the above-described range, it is possible to moderately enlarge the starting point of the pores formed by the stretching in the length direction and generate a fine porous structure.

The stretching speed at the above-described stretching steps is set to favorably 500 to 12000%/minute, more favorably 1500 to 10000%/minute, and most favorably 2500 to 8000%/minute.

In the stretching process, the enlargement ratio of area is set to favorably 3 to 48 times, more favorably 5 to 40 times, and most favorably 10 to 35 times longer than the original length of the unstretched membrane material. By setting the enlargement ratio of area to not less than three times longer than the original length of the unstretched membrane material, a sufficient air-permeable characteristic can be obtained, which is preferable. By setting the enlargement ratio of area to not more than 48 times longer than the original length thereof, it is possible to restrain the porous film from being broken and secure a sufficient molding processability, which is preferable.

To improve the dimensional stability of the porous polyolefin resin film obtained in the above-described manner, it is preferable to heat-treat it. In the heat treatment, by setting the heat treatment temperature to favorably not less than 100° C., more favorably not less than 120° C., and most favorably not less than 140° C., it is possible to allow the porous polyolefin resin film to be stable in its dimension. On the other hand, the heat treatment temperature is set to favorably not more than 170° C., more favorably not more than 165° C., and most favorably not more than 160° C. By setting the heat treatment temperature to not more than 170° C., the polyolefin resin is unlikely to be melted by the heat treatment and thus the porous structure can be maintained, which is preferable. Relaxation treatment may be performed at 1 to 20% as necessary while the heat treatment step is being performed. By uniformly cooling the membrane material and winding it after it is heat-treated, the porous polyolefin resin film of the present invention is obtained.

(Configuration and Property of Porous Polyolefin Resin Film)

The thickness of the porous polyolefin resin film of the present invention is set to favorably 5 to 100 µm, more favorably 8 to 50 µm, and most favorably 10 to 30 µm. In the case where the porous polyolefin resin film is used as the separator for the nonaqueous electrolytic solution secondary battery, by setting the thickness thereof to not less than 5 µm, the porous polyolefin resin film is capable of obtaining substantially necessary electrical insulating properties. For example, even though a great force is applied to a projected portion of an electrode, the projected portion is unlikely to cut through the separator for the nonaqueous electrolytic solution secondary battery and thus a short circuit is unlikely to occur. Thus the porous polyolefin resin film having a thickness in the above-described range is excellent in safety. By setting the thickness of the porous polyolefin resin film to not more than 100 µm, it is possible to decrease the electric resistance thereof and thus sufficiently secure the performance of the battery.

The porosity of the porous polyolefin resin film of the present invention is set to favorably not less than 50% and more favorably not less than 55%. By setting the porosity thereof to not less than 50%, the obtained porous polyolefin resin film is capable of sufficiently securing a low electric resistance in the case where the porous polyolefin resin film is used as the separator for the nonaqueous electrolytic solution secondary battery, and in addition, in the case where the porous polyolefin resin film is used to generate a high output, it is possible to restrain energy loss caused by heat generation, which is preferable.

On the other hand, regarding the upper limit of the porosity of the porous polyolefin resin film, the porosity thereof is set to favorably not more than 90%, more favorably not more than 85%, and most favorably not more than 80%. By setting the porosity thereof to not more than 90%, it is possible to sufficiently hold the mechanical strength thereof and in addition preferably accomplish secondary processing. The porosity is measured by using the method described in the examples.

The air permeability of the porous polyolefin resin film of the present invention is set to favorably not more than 200 seconds/100 ml. By setting the air permeability thereof to not more than 200 seconds/100 ml, the porous polyolefin resin film has the intercommunicable property. Thus the porous polyolefin resin film is excellent in its air-permeable performance and in addition effective from the standpoint of its output property in the case where the porous polyolefin resin film is used as the separator for the nonaqueous electrolytic solution secondary battery. Although the lower limit of the air permeability of the porous polyolefin resin film is not limited to a specific value, the air permeability thereof is set to favorably not less than 10 seconds/100 ml. By setting the air permeability thereof to not less than 10 seconds/100 ml, it is possible to sufficiently secure the mechanical strength of the porous polyolefin resin film and restrain pin holes from being generated.

The air permeability means the degree of difficulty in pass-through of air through the film in the thickness direction thereof and can be expressed in seconds it takes for air having a volume of 100 ml to pass through the film. Therefore the smaller is a numerical value of the air permeability, the more easily the air passes through the film. On the other hand, the larger is the numerical value of the air permeability, the more difficulty the air passes therethrough. That is, the smaller is the numerical value of the air permeability, the better is intercommunicable property of the film in the thickness direction thereof. The larger is the numerical value of the air permeability, the worse is the intercommunicable property of the film in the thickness direction thereof. The intercommunicable property means the degree of connection among pores of the film in the thickness direction thereof. When the porous polyolefin resin film of the present invention has a low air permeability, it is applicable to various uses. For example, when the porous polyolefin resin film having a low air permeability is used as the separator of the battery, lithium ions are capable of moving easily, and thus the battery has an excellent electrical performance, which is preferable.

In the case where the porous polyolefin resin film of the present invention is used as the separator for the nonaqueous electrolytic solution secondary battery, it is preferable that the porous polyolefin resin film has the SD property. Specifically, after the porous polyolefin resin film is heated at 135° C. for 5 seconds, the air permeability thereof is favorably not less than 10000 seconds/100 ml, more favorably not less than 25000 seconds/100 ml, and most favorably not less than 50000 seconds/100 ml. By setting the air permeability of the porous polyolefin resin film after it is heated at 135° C. for 5 seconds to not less than 10000 seconds/100 ml, pores are closed rapidly when heat is abnormally generated, and electric current is shut off. Thereby it is possible to avoid the occurrence of troubles of the battery such as rupture.

It is preferable that a break-down property (BD property) appears in the porous polyolefin resin film of the present invention at not less than 160° C.

That is, a temperature (break-down temperature) at which the break-down property appears in the porous polyolefin resin film of the present invention is favorably not less than 160° C., more favorably not less than 200° C., and most favorably not less than 250° C. When the break-down temperature is less than 160° C., there is no difference between a temperature at which the shut-down property appears and a temperature at which the break-down property appears. In the case where the porous polyolefin resin film of the present invention is used as the separator for the nonaqueous electrolytic solution secondary battery, it is impossible to provide the battery with a sufficiently secured safety, which is unpreferable. Although the high-temperature side of the break-down property is not limited to a specific temperature, it is preferable that the break-down property appears at not more than 300° C.

The lowest temperature of temperatures at which the porous polyolefin resin film of the present invention is broken when it is heated in the method described in the examples is called the "break-down temperature".

It is preferable that the thermal contraction percentage of the porous polyolefin resin film in the direction vertical to the flow direction thereof (TD thermal contraction percentage) is less than 10%. In the case where the porous polyolefin resin film is used as the separator for the nonaqueous electrolytic solution secondary battery, lamination units consisting of positive and negative electrodes and the separator are incorporated in the nonaqueous electrolytic solution secondary battery by laminating the lamination units one upon another in the form of the positive electrode/the separator/the negative electrode/the separator in many cases. Normally a cylindrical battery called 18650 cell is produced by laminating the lamination units one upon another in the form of a belt and winding them together. Thus when the separator thermally contracts because the battery is used in a high-temperature environment, there is a possibility that the positive and negative electrodes contact each other and thus there is an increase of a risk that an internal short-circuit occurs in the nonaqueous electrolytic solution secondary battery. Therefore it is preferable that the TD thermal contraction percentage of the porous polyolefin resin film is less than 10%. It is also preferable that similarly to the TD thermal contraction percentage of the porous polyolefin resin film, the thermal contraction percentage in its flow direction (MD thermal contraction percentage) is less than 10% to prevent the occurrence of the internal short-circuit.

(Battery)

The nonaqueous electrolytic solution secondary battery accommodating the porous polyolefin resin film of the present invention as the separator therefor is described below with reference to FIG. 1.

Both a positive electrode plate 21 and a negative electrode plate 22 are spirally wound in such a way that the positive electrode plate 21 and the negative electrode plate 22 are overlapped each other via a separator 10. The outer side of the positive electrode plate 21 and that of the negative electrode plate 22 are fixed with a tape to obtain a body consisting of both electrode plates 21 and 22 and the separator 10 integrally wound.

The above-described winding step is described in detail below. One end of the separator for the battery is passed through a slit portion of a pin. Thereafter the pin is rotated a little to wind the other end of the separator for the battery round the pin. At this time, the surface of the pin and the heat-resistant layer of the separator for the battery are in contact with each other. Thereafter the positive and negative electrodes are so arranged as to sandwich the separator for the battery therebetween. The pin is rotated to wind the positive and negative electrodes and the separator for the battery by using a winding machine. After the winding operation finishes, the pin is pulled out of body consisting of both electrode plates 21 and 22 and the separator 10 integrally wound.

The body composed of the positive electrode plate 21, the separator 10 for the battery, and the negative electrode plate 22 integrally wound is accommodated inside a bottomed cylindrical battery case and welded to a positive lead 24 and a negative lead 25. Thereafter the electrolyte is injected into the battery can. After the electrolyte penetrates into the separator 10 sufficiently, the periphery of the opening of the battery can is sealed with a positive lid 27 via a gasket 26. Thereafter preparatory charge and aging are carried out to produce a cylindrical nonaqueous electrolytic solution battery.

The electrolytic solution composed of an organic solvent in which a lithium salt is dissolved is used. Although the organic solvent is not limited to a specific kind, esters such as propylene carbonate, ethylene carbonate, butylene carbonate, γ-butyrolactone, γ-valerolactone, dimethyl carbonate, methyl propionate, and butyl acetate; nitriles such as acetonitrile; ethers such as 1,2-dimethoxyethane, 1,2-dimethoxymethane, dimethoxypropane, 1,3-dioxolane, tetrahydrofuran, 2-methyltetrahydrofuran, and 4-methyl-1,3-dioxofuran; and sulfolane are listed. These organic solvents can be used singly or in combination of not less than two kinds thereof.

Above all, an electrolyte in which 1.0 mol/L of lithium phosphate hexafluoride ($LiPF_6$) is dissolved in a solvent in which two parts by mass of methyl ethyl carbonate is mixed with one part by mass of ethylene carbonate is preferable.

As the negative electrode, an alkali metal or a compound, containing the alkali metal, which is integrated with a current collector such as a net made of stainless steel is used. As the alkali metal, lithium, sodium, and potassium are listed. As the compound containing the alkali metal, alloys of the alkali metal and aluminum, lead, indium, potassium, cadmium, tin or magnesium; compounds of the alkali metals and a carbon material; and compounds of the alkali metal having a low electric potential and metal oxides or sulfides are listed.

In the case where the carbon material is used for the negative electrode, it is possible to use those capable of doping or de-doping lithium ions. For example, it is possible to use graphite, pyrolytically decomposed carbons, cokes, glassy carbons, calcined organic polymeric compounds, mesocarbon microbeads, carbon fibers, and activated carbon.

A negative electrode plate produced as follows is used as the negative electrode in this embodiment. A carbon material having an average particle diameter of 10 μm is mixed with a solution in which vinylidene fluoride is dissolved in N-methylpyrrolidone to obtain a slurry. After the slurry, consisting of the mixture of the above-described substances, which forms the negative electrode is passed through a 70-mesh net to remove large particles, the slurry is uniformly applied to both surfaces of a negative current collector consisting of a belt-shaped copper foil having a thickness of 18 μm and is dried. After the slurry is compression-molded by a roll press machine, the molding is cut to obtain the belt-shaped negative electrode plate.

A molding produced as follows is used as the positive electrode. A metal oxide such as lithium cobalt oxide, lithium nickel oxide, lithium manganese oxide, manganese dioxide, vanadium pentoxide or chromium oxide and a metal sulfide such as molybdenum disulfide are used as the active substance of the positive electrode. A conductive assistant and a binding agent such as polytetrafluoroethylene are appropriately added to the positive active substance to obtain a combination of these substances. Thereafter the combination of these substances is processed into the molding by using a current collector such as stainless steel net as the core of the positive electrode.

In this embodiment, as the positive electrode, a belt-shaped positive electrode plate produced as described below is used. That is, as a conductive assistant, scaly graphite is added to the lithium cobalt oxide ($LiCoO_2$) at a mass ratio of the lithium cobalt oxide:the scaly graphite=90:5. Both substances are mixed with each other to form a mixture. The mixture and a solution in which the polyvinylidene fluoride is dissolved in the N-methylpyrrolidone are mixed with each other to obtain a slurry. After the slurry, consisting of the mixture of these substances, which forms the positive electrode is passed through the 70-mesh net to remove large particles, the slurry is uniformly applied to both surfaces of a positive current collector consisting of an aluminum foil having a thickness of 20 μm and dried. After the slurry is compression-molded with the roll press machine, the molding is cut to obtain the belt-shaped positive electrode plate.

EXAMPLES

Examples and comparison examples of the present invention are shown below. Although the porous polyolefin resin film of the present invention is described in detail below, the present invention is not limited thereby. The longitudinal direction of the porous polyolefin resin film is called the "length direction", whereas the direction vertical to the longitudinal direction is called the "width direction".

Examples and comparison examples of the present invention are shown below. Although the porous polyolefin resin film of the present invention is described in detail below, the present invention is not limited thereby. The longitudinal direction of the porous polyolefin resin film is called the "length direction", whereas the direction vertical to the longitudinal direction is called the "width direction".

(1) Thickness

The in-plane thickness of each porous polyolefin resin film was measured at unspecified 30 points thereof with a dial gauge of 1/1000 mm. The average of the measured values is shown as the thickness thereof.

(2) Air Permeability (Gurley Value)

The air permeability (second/100 ml) of each porous polyolefin resin film was measured in accordance with JIS P8117. The obtained air permeabilities were evaluated as follows:

○: Air permeability was 10 to 200 seconds/100 ml.
x: Air permeability was less than 10 seconds/100 ml or more than 200 seconds/100 ml.

(3) Porosity

The porosity is a numerical value indicating the rate of spatial portions in the porous polyolefin resin film. A substantial amount W1 of the porous polyolefin resin film was measured. To determine the porosity, a substantial amount W1 of the film was measured, and a mass W0 was computed when the porosity was 0% from the density and thickness of the resin composition. From the value of the substantial amount W1 and that of the mass W0, the porosity can be determined based on an equation shown below.

Porosity Pb(%)={(W0−W1)/W0}×100

Obtained porosities were evaluated as follows:
○: Porosity was 55 to 90%.
x: Porosity was less than 55% or more than 90%.

(4) TD Thermal Contraction Percentage

The porous polyolefin resin film of each of the examples and the comparison examples was cut to prepare a specimen in the shape of 150 mm long×10 mm wide in the width direction thereof, and marked lines were drawn at intervals of 100 mm in the length direction thereof. Each of the prepared specimen was put in an oven (DK-1M produced by DAIEI KAGAKU SEIKI MFG. CO., LTD.) set to 105° C. with a portion of the specimen disposed at the outer side of each marked line being sandwiched between a clip. After the elapse of one hour, the specimen was taken out of the oven to measure an interval L (mm) between the marked lines. The thermal contraction percentage was computed based on the following equation.

Thermal contraction percentage (%)=100−L (5) Shut-Down Temperature (SD Temperature)

Figure 2A:
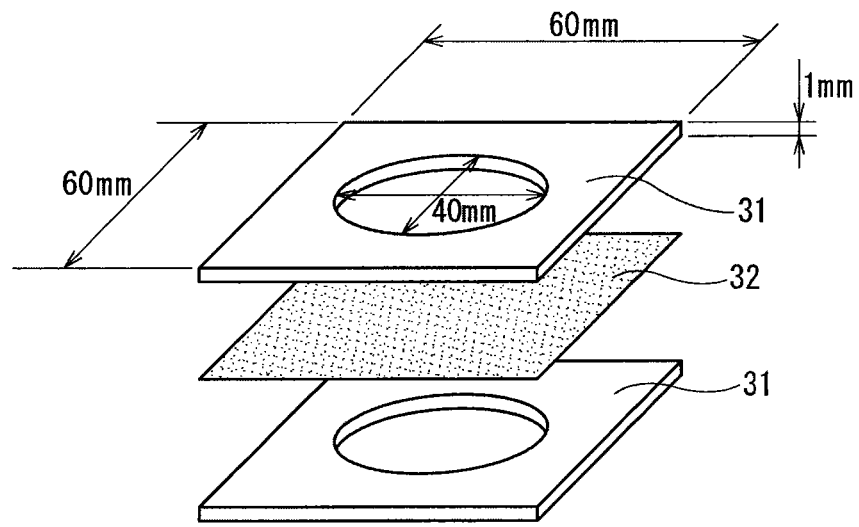
FIG. 2 explains a method of fixing the porous polyolefin resin film in measuring its shut-down property, break-down property, and wide-angle X-ray diffraction.
Figure 2B:
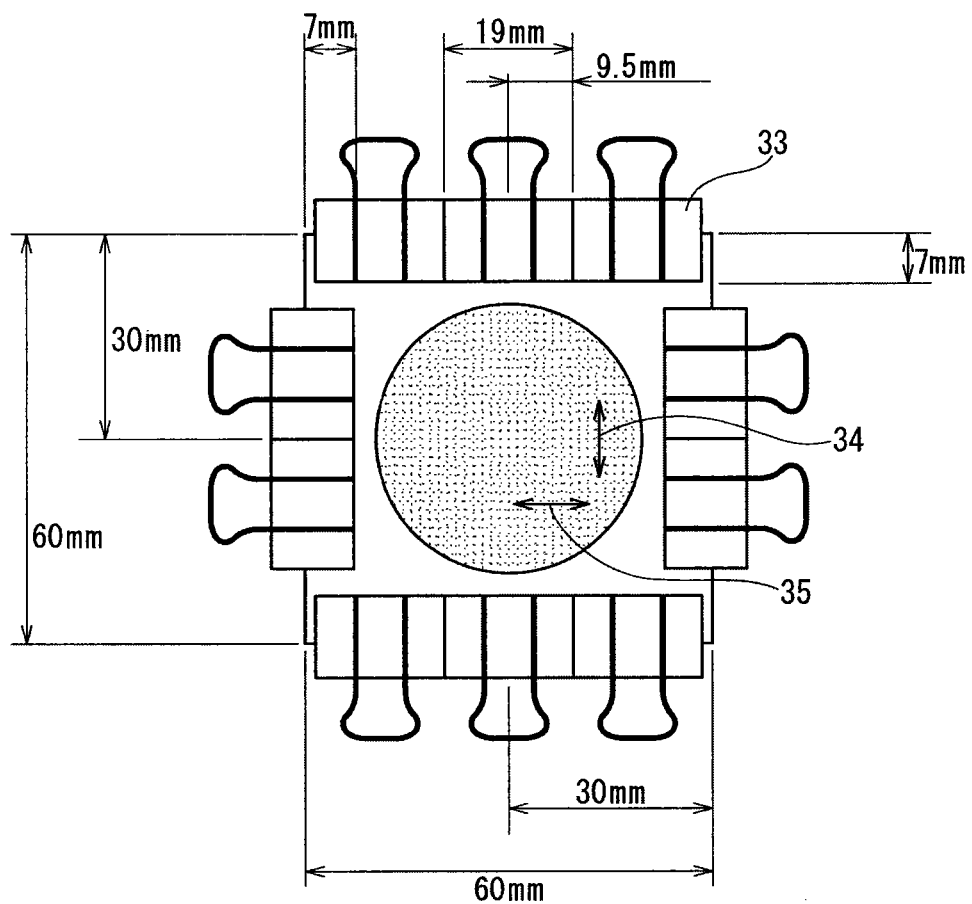

Each of the porous polyolefin resin films obtained by cutting was square and had a dimension of 60 mm long×60 mm wide. As shown in FIG. 2(A), each porous polyolefin resin film was sandwiched between two aluminum plates (material: JIS A5052, size: 60 mm in the length direction 34 of the film, 60 mm in the width direction 35 thereof, and 1 mm in the thickness thereof) where a circular hole having a diameter of Φ40 mm was formed at the central portion. As shown in FIG. 2(B), the periphery of each porous polyolefin resin film was fixed with clips.

Thereafter each sample restrained by the two aluminum plates was immersed at a central portion of an oil bath (OB-200A produced by As one Co., Ltd.), having a temperature of 135° C., in which glycerin (first class produced by Nacalai Tesque Inc.) was filled up to 100 mm from its bottom surface. The sample was heated for 5 seconds. Immediately after the heating finished, the sample was immersed in a separately prepared cooling bath in which glycerin having a temperature of 25° C. was filled to cool the sample for 5 minutes. After the sample was cleaned with 2-propanol (high grade produced by Nacalai Tesque Inc.) and acetone (high grade produced by Nacalai Tesque Inc.), the sample was dried for 15 minutes in an air atmosphere having a temperature of 25° C. The air permeability of each of the dried samples was measured in accordance with the method used in the above-described method (2). Based on the above-described measurement, the air permeabilities of the porous polyolefin resin films were evaluated in accordance with the following standard. Films evaluated as ○ were judged as having the shut-down property.

○: not less than 50000 seconds/100 ml
Δ: not less than 10000 seconds/100 ml or less than 50000 seconds/100 ml
x: less than 10000 seconds/100 ml

(6) Break-Down Property (BD Property)

The film of each of the examples and the comparison examples fixed to two aluminum plates by carrying out a method similar to that shown in FIGS. 2(A) and 2(B) was put in an oven (Tabai gear oven "GPH200 (commercial name)" produced by Tabai Espec Corporation, damper was kept closed) set to 180° C. Each film was taken out of the oven in two minutes after the set temperature of the oven reached 180° C. again. Thereafter the state of the film was checked to judge the configuration-maintaining performance thereof.

Films broken were evaluated as "x", whereas films which maintained the original configuration were evaluated as "○".

The β crystal activity of each of the obtained porous polyolefin resin films was evaluated as follows:

(7) Differential Scanning calorimetry (DSC)

By using a differential scanning calorimeter (DSC-7) produced by PerkinElmer Inc., the porous polyolefin resin films were heated from 25° C. up to 240° C. at a heating speed of 10° C./minute and allowed to stand for one minute. Thereafter the porous polyolefin resin films were cooled from 240° C. down to 25° C. at a cooling speed of 10° C./minute and allowed to stand for one minute. Thereafter the porous polyolefin resin films were heated again from 25° C. up to 240° C. at the heating speed of 10° C./minute. When the porous polyolefin resin films were heated again, whether they had the β crystal activity or not was evaluated based on the following standard according to whether a peak was detected in the range of 145° C. to 160° C. which is the crystalline melting peak temperature (Tmβ) derived from the β crystal of the polypropylene resin.

○: Porous polyolefin resin films in which Tmβ was detected in the range of 145° C. to 160° C. (they had β crystal activity).

x: Porous polyolefin resin films in which Tmβ was not detected in the range of 145° C. to 160° C. (they did not have β crystal activity).

The β activity of each of the porous polyolefin resin films having a weight of 10 mg was measured in a nitrogen atmosphere.

(8) Wide-Angle X-Ray Diffraction Measurement (XRD)

Each of the porous polyolefin resin films obtained by cutting was square and had a dimension of 60 mm long×60 mm wide. As shown in FIG. 2(A), each porous polyolefin resin film was sandwiched between the two aluminum plates (material: JIS A5052, size: 60 mm in the length direction 34 of the film, 60 mm in the width direction 35 thereof, and 1 mm in the thickness thereof) where the circular hole having the diameter of Φ40 mm was formed at the central portion. As shown in 2(B), the peripheries of the aluminum plates were fixed with clips.

Each sample in which the porous polyolefin resin film fixed to the two aluminum plates was put in a blow isothermal instrument (Model: DKN602 produced by Yamato Science Corporation) having a set temperature of 180° C. and a display temperature of 180° C. After each sample was allowed to stand therein for three minutes, the set temperature was altered to 100° C. Thereafter the sample was gradually cooled for not less than 10 minutes to cool it to 100° C. When the display temperature became 100° C., the sample was taken out of the blow isothermal instrument. The sample was cooled for 5 minutes in an atmosphere having a temperature of 25° C. with the sample being fixed to the two aluminum plates. Thereafter wide-angle X-ray diffraction measurement was carried out on the circular central portion, of the sample, having the diameter of Φ40 mm in the following measuring conditions:

Wide-angle X-ray diffraction measuring apparatus: Model Number: XMP18A produced by Mac science Co., Ltd.

X-ray source: CuK-α ray, output: 40 kV, 200 mA

Scanning method: 2θ/θ scan, 2θ range: 5° to 25°, scanning interval: 0.05°, scanning speed: 5°/minute Obtained diffraction profiles were checked to evaluate whether the films had the β activity according to whether a peak derived from a (300) surface of the β crystal of the polypropylene was detected in the range of 2θ=16.0° to 16.5°.

○: Films in which the peak was detected in the range of 2θ=16.0° to 16.5° (films had the β activity)

x: Films in which the peak was not detected in the range of 2θ=16.0° to 16.5° (films did not have the β activity)

In the case where the porous polyolefin resin film cannot be obtained in the dimension of 60 mm long×60 mm wide by cutting, a specimen may be prepared by placing the film at the circular hole, of the aluminum plates, which had the diameter of Φ40 mm and was formed at the central portion thereof.

Example 1

0.2 mass % of a β crystal nucleating agent consisting of 3,9-bis[4-(N-cyclohexylcarbamoyl)phenyl]-2,4,8,10-tetraoxaspiro[5.5]undecane and 1 mass % of organic-inorganic hybrid particles (SPT014 produced by TAKEMOTO OIL AND FAT CO., LTD., average particle diameter: 0.3 μm) were added to 100 mass % of polypropylene resin (Novatec PP FY6HA, MFR: 2.4 g/10 minutes, melting point: 158° C.). After the mixture of the above-described components was supplied to a same-direction twin screw extruder (produced by Toshiba Machine Co., Ltd., diameter: 40 mmΦ, L/D: 32), the mixture was melted and kneaded at a set temperature of 300° C. and extruded from a strand die. Thereafter a strand was cooled in water to solidify it and cut with a cutter to produce a pellet of polypropylene resin composition.

After the polypropylene resin composition was extruded from a T-die, it was cooled to solidify it by using a casting roll having a temperature of 127° C. to prepare an unporous membrane material.

The unporous membrane material was stretched 4.6 times longer than its original length in its length direction by using a lengthwise stretching machine. After the unporous membrane material was stretched 2 times longer than its original length in its width direction at 150° C. by using a widthwise stretching machine, the unporous membrane material was subjected to heat fixation/relaxation treatment.

The properties of the obtained porous polyolefin resin film were evaluated. Table 1 shows the results.

Example 2

The porous polyolefin resin film was produced by carrying out a method similar to that of the example 1 except that the addition amount of the organic-inorganic hybrid particles (SPT014 produced by TAKEMOTO OIL AND FAT CO., LTD., average diameter: 0.3 μm) was altered to 3 mass %.

The properties of the obtained porous polyolefin resin film were evaluated. Table 1 shows the results.

Example 3

The porous polyolefin resin film was produced by carrying out a method similar to that of the example 1 except that the addition amount of the organic-inorganic hybrid particles (SPT014 produced by TAKEMOTO OIL AND FAT CO., LTD., average diameter: 0.3 μm) was altered to 5 mass %.

The properties of the obtained porous polyolefin resin film were evaluated. Table 1 shows the results.

Example 4

The porous polyolefin resin film was produced by carrying out a method similar to that of the example 1 except that the addition amount of organic-inorganic hybrid particles (SPT013 produced by TAKEMOTO OIL AND FAT CO., LTD., average diameter: 0.6 μm) was set to 1 mass %.

The properties of the obtained porous polyolefin resin film were evaluated. Table 1 shows the results.

Example 5

The porous polyolefin resin film was produced by carrying out a method similar to that of the example 1 except that the addition amount of the organic-inorganic hybrid particles (SPT013 produced by TAKEMOTO OIL AND FAT CO., LTD., average diameter: 0.6 μm) was altered to 5 mass %.

The properties of the obtained porous polyolefin resin film were evaluated. Table 1 shows the results.

Comparison Example 1

Although the production of the porous polyolefin resin film was attempted by carrying out a method similar to that of the example 1 except that 5 mass % of alumina (Sumicorundum AA-07 produced by Sumitomo Chemical Co., Ltd., average particle diameter: 0.7 μm) was added to the polypropylene resin instead of the organic-inorganic hybrid particles (f), pockmarks were generated owing to defective dispersibility of the alumina when the resin composition was extruded from the T-die. Thus a favorable unporous membrane material could not be obtained.

Comparison Example 2

The porous polyolefin resin film was produced by carrying out a method similar to that of the example 1 except that 3 mass % of polymethylpentene (TPX RT-18 produced by Mitsui Chemicals, Inc.) was added to the polypropylene resin instead of the organic-inorganic hybrid particles (f).

The properties of the obtained porous polyolefin resin film were evaluated. Table 1 shows the results.

Comparison Example 3

The porous polyolefin resin film was produced by carrying out a method similar to that of the example 1 except that 3 mass % of polycarbonate (Tafron produced by Idemitsu Kosan Co., Ltd.) was added to the polypropylene resin instead of the organic-inorganic hybrid particles (f).

The properties of the obtained porous polyolefin resin film were evaluated. Table 1 shows the results.

Comparison Example 4

The porous polyolefin resin film was produced by carrying out a method similar to that of the example 1 except that the organic-inorganic hybrid particles (f) were not added to the polypropylene resin.

The properties of the obtained porous polyolefin resin film were evaluated. Table 1 shows the results.

TABLE 1

| | | Example 1 | Example 2 | Example 3 | Example 4 | Example 5 | Comparison example 1 | Comparison example 2 | Comparison example 3 | Comparison example 4 |
|---|---|---|---|---|---|---|---|---|---|---|
| Organic-inorganic hybrid particle | SPT014 | 1 | 3 | 5 | | | | | | |
| | 3PT013 | | | | 1 | 5 | | | | |
| Alumina | AA-07 | | | | | | 3 | | | |
| Polymethylpentene | TPXRT-18 | | | | | | | 3 | | |
| Polycarbonate | A1900 | | | | | | | | 3 | |
| Thickness | μm | 20 | 20 | 20 | 20 | 20 | Impossible to mold | 20 | 20 | 20 |
| Air permeability | Second/100 ml | 178 | 181 | 144 | 196 | 146 | | 349 | 541 | 291 |
| | — | ○ | ○ | ○ | ○ | ○ | | x | x | x |
| Porosity | % | 57 | 56 | 58 | 55 | 58 | | 59 | 53 | 54 |
| | — | ○ | ○ | ○ | ○ | ○ | | ○ | x | x |
| BD property | — | ○ | ○ | ○ | ○ | ○ | | ○ | ○ | ○ |
| DSC | — | ○ | ○ | ○ | ○ | ○ | | ○ | ○ | ○ |
| XRD | — | ○ | ○ | ○ | ○ | ○ | | ○ | ○ | ○ |

Example 6

To form the layer A, 0.2 mass % of the β crystal nucleating agent consisting of the 3,9-bis[4-(N-cyclohexylcarbamoyl)phenyl]-2,4,8,10-tetraoxaspiro[5.5]undecane and 3 mass % of the organic-inorganic hybrid particles (SPT014 produced by TAKEMOTO OIL AND FAT CO., LTD., average diameter: 0.3 μm) were added to 100 mass % of the polypropylene resin (Novatec PP FY6HA, MFR: 2.4 g/10 minutes, melting point: 158° C.). After the mixture of the above-described components was supplied to the same-direction twin screw extruder (produced by Toshiba Machine Co., Ltd., diameter: 40 mmΦ, L/D: 32), the mixture was melted and kneaded at a set temperature of 300° C. and extruded from the strand die. Thereafter the strand was cooled in water to solidify it and cut with the cutter to produce a pellet of the polypropylene resin composition.

As a resin composition composing the layer B, high-density polyethylene (HI-ZEX 3600 F produced by Prime Polymer Co., Ltd, MFR: 1.0 g/10 minutes, melting point: 133° C.) was used.

The above-described two kinds of the materials were extruded from mouthpieces for lamination molding through a feed block for forming the two-kind three-layer structure by using different extruders in such a way that the layer A is disposed at the outer layers of a laminated membrane material the layer B is disposed at the intermediate layer thereof. Thereafter the two kinds of the materials were cooled to solidify them by using a casting roll having a temperature of 127° C. In this manner, the laminated membrane material having the two-kind three-layer structure consisting of the layer A/the layer B/the layer A laminated one upon another was produced.

The laminated membrane material was stretched 4.2 times longer than its original length in its length direction by using the lengthwise stretching machine. After the laminated membrane material was stretched 2.0 times longer than its original length in its width direction at 95° C. by using the widthwise stretching machine, the laminated membrane material was subjected to heat fixation/relaxation treatment.

The properties of the obtained porous polyolefin resin film were evaluated. Table 2 shows the results.

Example 7

The porous polyolefin resin film was produced by carrying out a method similar to that of the example 6 except that the addition amount of the organic-inorganic hybrid particles (SPT014 produced by TAKEMOTO OIL AND FAT CO., LTD., average diameter: 0.3 μm) of the layer A was altered to 5 mass %.

The properties of the obtained porous polyolefin resin film were evaluated. Table 2 shows the results.

Comparison Example 5

Although the production of the porous polyolefin resin film was attempted by carrying out a method similar to that of the example 6 except that 5 mass % of the alumina (Sumicorundum AA-03 produced by Sumitomo Chemical Co., Ltd., average particle diameter: 0.3 μm) was added to the polypropylene resin instead of the organic-inorganic hybrid particles (f) of the layer A, pockmarks were generated owing to defective dispersibility of the alumina when the resin composition was extruded from a mouthpiece for laminate molding through a feed block for forming a film having the two-kind three-layer structure. Thus a favorable laminated membrane material could not be obtained.

Comparison Example 6

The porous polyolefin resin film was produced by carrying out a method similar to that of the example 6 except that the organic-inorganic hybrid particles (f) was not added to the polypropylene resin.

The properties of the obtained porous polyolefin resin film were evaluated. Table 2 shows the results.

Example 8

0.2 mass % of the β crystal nucleating agent consisting of the 3,9-bis[4-(N-cyclohexylcarbamoyl)phenyl]-2,4,8,10-tetraoxaspiro[5.5]undecane and 3 mass % of the organic-inorganic hybrid particles (SPT014 produced by TAKEMOTO OIL AND FAT CO., LTD., average diameter: 0.3 μm) were added to 100 mass % of the polypropylene resin (Novatec PP FY6HA, MFR: 2.4 g/10 minutes, melting point: 158° C.). After the mixture of the above-described components was supplied to the same-direction twin screw extruder (produced by Toshiba Machine Co., Ltd., diameter: 40 mmΦ, L/D: 32), the mixture was melted and kneaded at a set temperature of 300° C. and extruded from the strand die. Thereafter the strand was cooled in water to solidify it and cut with the cutter to produce a pellet of the polypropylene resin composition.

After the above-described polypropylene resin composition was extruded from the T-die, it was cooled to solidify it by using the casting roll having a temperature of 127° C. to prepare an unporous membrane material.

The unporous membrane material was stretched 4.6 times longer than its original length in its length direction by using the lengthwise stretching machine. After the unporous membrane material was stretched 3 times longer than its original length in its width direction at 150° C. by using the widthwise stretching machine, the unporous membrane material was subjected to heat fixation/relaxation treatment.

The properties of the obtained porous polyolefin resin film were evaluated. Table 3 shows the results.

Example 9

The porous polyolefin resin film was produced by carrying out a method similar to that of the example 8 except that the unporous membrane material was stretched four times longer than its original length in its width direction at 150° C. by using the widthwise stretching machine.

The properties of the obtained porous polyolefin resin film were evaluated. Table 3 shows the results.

Example 10

The porous polyolefin resin film was produced by carrying out a method similar to that of the example 8 except that the unporous membrane material was stretched 5 times longer than its original length in its width direction at 150° C. by using the widthwise stretching machine.

TABLE 2

|  |  | Example 6 | Example 7 | Comparison example 5 | Comparison example 6 |
|---|---|---|---|---|---|
| Organic-inorganic hybrid particles | SPT014 | 3 | 5 |  |  |
| Alumina | AA-07 |  |  | 3 |  |
| Thickness | um | 20 | 20 | Impossible to mold | 20 |
| Air permeability | Second/100 ml | 194 | 171 |  | 260 |
|  | — | ○ | ○ |  | X |
| Porosity | % | 60 | 61 |  | 57 |
|  | — | ○ | ○ |  | ○ |
| TD thermal contraction percentage | % | 8 | 9 |  | 8 |
| SD property | — | ○ | ○ |  | ○ |
| BD property | — | ○ | ○ |  | ○ |
| DSC | — | ○ | ○ |  | ○ |
| XRD | — | ○ | ○ |  | ○ |

The properties of the obtained porous polyolefin resin film were evaluated. Table 3 shows the results.

Example 11

The porous polyolefin resin film was produced by carrying out a method similar to that of the example 8 except that the unporous membrane material was stretched 6 times longer than its original length in its width direction at 150° C. by using the widthwise stretching machine.

The properties of the obtained porous polyolefin resin film were evaluated. Table 3 shows the results.

Example 12

The porous polyolefin resin film was produced by carrying out a method similar to that of the example 8 except that the unporous membrane material was stretched 7 times longer than its original length in its width direction at 150° C. by using the widthwise stretching machine.

The properties of the obtained porous polyolefin resin film were evaluated. Table 3 shows the results.

Comparison Example 5

The porous polyolefin resin film was produced by carrying out a method similar to that of the example 8 except that the organic-inorganic hybrid particles (f) were not added to the polypropylene resin.

The properties of the obtained porous polyolefin resin film were evaluated. Table 3 shows the results.

Comparison Example 6

The porous polyolefin resin film was produced by carrying out a method similar to that of the comparison example 5 except that the unporous membrane material was stretched 5 times longer than its original length in its width direction at 150° C. by using the widthwise stretching machine.

The properties of the obtained porous polyolefin resin film were evaluated. Table 3 shows the results.

Comparison Example 7

The porous polyolefin resin film was produced by carrying out a method similar to that of the comparison example 5 except that the unporous membrane material was stretched 6 times longer than its original length in its width direction at 150° C. by using the widthwise stretching machine.

The properties of the obtained porous polyolefin resin film were evaluated. Table 3 shows the results.

Comparison Example 8

The porous polyolefin resin film was produced by carrying out a method similar to that of the comparison example 5 except that the unporous membrane material was stretched 7 times longer than its original length in its width direction at 150° C. by using the widthwise stretching machine.

The properties of the obtained porous polyolefin resin film were evaluated. Table 3 shows the results.

TABLE 3

| | Unit | Example 8 | Example 9 | Example 10 | Example 11 | Example 12 | Comparison example 5 | Comparison example 6 | Comparison example 7 | Comparison example 8 |
|---|---|---|---|---|---|---|---|---|---|---|
| Stretch ratio in width direction | Ratio | 3 | 4 | 5 | 6 | 7 | 3 | 5 | 6 | 7 |
| Enlargement ratio of area | Ratio | 13.8 | 18.4 | 23 | 27.6 | 32.2 | 13.3 | 23 | 27.6 | 32.2 |
| Air permeability | Second/100 ml | 131 | 128 | 116 | 112 | 109 | 273 | 233 | 264 | 324 |
| | — | ○ | ○ | ○ | ○ | ○ | x | x | x | x |
| Porosity | % | 66 | 65 | 67 | 67 | 67 | 59 | 51 | 51 | 52 |
| | — | ○ | ○ | ○ | ○ | ○ | ○ | x | x | x |
| β activity | — | ○ | ○ | ○ | ○ | ○ | ○ | ○ | ○ | ○ |
| BD property | — | ○ | ○ | ○ | ○ | ○ | ○ | ○ | ○ | ○ |
| DSC | — | ○ | ○ | ○ | ○ | ○ | ○ | ○ | ○ | ○ |
| XRD | — | ○ | ○ | ○ | ○ | ○ | ○ | ○ | ○ | ○ |

The porous polyolefin resin films obtained in the examples of the present invention have a high air-permeable characteristic and a high porosity.

In the comparison examples 1 and 5 in which alumina was added to the polypropylene resin as inorganic particles instead of the organic-inorganic hybrid particles (f), the resin composition could not be molded owing to a defective dispersibility of the inorganic particles. Thus the porous polyolefin resin film could not be obtained.

In the comparison examples 2 and 3 in which the thermoplastic resin incompatible with the polyolefin resin was added to the polypropylene resin instead of the organic-inorganic hybrid particles (f) and in the comparison examples 4 and 6 in which the organic-inorganic hybrid particles (f) was not added to the polypropylene resin, each of the obtained porous polyolefin resin films had an insufficient air-permeable characteristic and a porosity lower than the porosities of the porous polyolefin resin films of the examples.

The porous polyolefin resin film of the examples 8 through 12 containing the organic-inorganic hybrid particles (f) had a higher permeation characteristic with an increase in the enlargement ratio of area. On the other hand, in the porous polyolefin resin film of the comparison examples 5 through 8 not containing the organic-inorganic hybrid particles (f), the permeation characteristic thereof became lower with an increase in the enlargement ratio of area.

INDUSTRIAL APPLICABILITY

The laminated porous film of the present invention can be applied to various uses in which air-permeable property is demanded. The laminated porous film can be suitably used as a material for the separator of the lithium battery; materials for hygienic products such as disposable diaper, body fluid absorbing pats such as sanitary products, a bed sheet, and the like; materials for medical supplies such as surgical gown, a base material for stupe, and the like; materials for clothing items such as jumper, sportswear, rain wear, and the like; building materials such as wallpaper, a roof-waterproofing material, a heat insulation material, a sound-absorbing material, and the like; a material for a container of a desiccant; a material for a container of a moisture-proof agent; a material for a container of a deoxidizer; a material for a pocket warmer; and a material for a package of packing foods to keep them fresh, and a material for a package of packing foods.

EXPLANATION OF REFERENCE SYMBOLS AND NUMERALS

20: secondary battery
21: positive electrode plate
22: negative electrode plate
24: positive lead
25: negative lead
26: gasket
27: positive lid
31: aluminum plate
32: sample
33: clip
34: length direction of film
35: width direction of film

What is claimed is:

1. A porous polyolefin resin film, comprising:
a first resin composition comprising a polyolefin resin as a main component; and
organic-inorganic hybrid particles,
wherein the organic-inorganic hybrid particles are organic silicon fine particles consisting of a polysiloxane crosslinked structure, and
the organic silicon fine particles are ring-shaped.

2. The porous polyolefin resin film according to claim 1, wherein an amount of the organic-inorganic hybrid particles is not less than 1 part by mass and not more than 10 parts by mass, relative to 100 parts by mass of the polyolefin resin.

3. The porous polyolefin resin film according to claim 1, wherein
the organic silicon fine particles have an average particle diameter of 0.01 to 10μm.

4. The porous polyolefin resin film according to claim 1, wherein an air permeability of the resin film is not less than 10 seconds/100 ml and not more than 200 seconds/100 ml.

5. The porous polyolefin resin film according to claim 1, wherein a porosity of the resin film is 55 to 90%.

6. The porous polyolefin resin film according to claim 1, which is formed by laminating a layer consisting essentially of the first resin composition on a layer consisting of a second resin composition having a crystalline melting peak temperature lower than that of the first resin composition.

7. The porous polyolefin resin film according to claim 1, wherein the polyolefin resin is a polypropylene resin having a β crystal activity.

8. A separator for a nonaqueous electrolytic solution secondary battery, comprising the porous polyolefin resin film according to claim 1.

9. A nonaqueous electrolytic solution secondary battery, comprising the separator according to claim 8.

10. The porous polyolefin resin film according to claim 2, wherein
the organic silicon fine particles have an average particle diameter of 0.01 to 10μm.

11. The porous polyolefin resin film according to claim 2, wherein an air permeability of the resin film is not less than 10 seconds/100 ml and not more than 200 seconds/100 ml.

12. The porous polyolefin resin film according to claim 2, wherein a porosity of the resin film is 55 to 90%.

13. The porous polyolefin resin film according to claim 2, which is formed by laminating a layer consisting essentially of the first resin composition on a layer consisting of a second resin composition having a crystalline melting peak temperature lower than that of the first resin composition.

14. The porous polyolefin resin film according to claim 2, wherein the polyolefin resin is a polypropylene resin having a β crystal activity.

15. The porous polyolefin resin film according to claim 1, wherein the polysiloxane crosslinked structure comprises a siloxane unit of formula 1, a siloxane unit of formula 2, a siloxane unit of formula 3, a siloxane unit of formula 4, a siloxane unit of formula 5, and a siloxane unit of formula 6, $$SiO_{4/2} \tag{formula 1}$$

$$Si(OH)O_{3/2} \tag{formula 2}$$

$$R^1(OH)O_{3/2} \tag{formula 3}$$

$$R^2(OH)O_{3/2} \tag{formula 4}$$

$$R^3Si(OH)O_{2/2} \tag{formula 5}$$

$$R^4Si(OH)O_{2/2} \tag{formula 6},$$

wherein
each of $R^1$ and $R^3$ is an unreactive hydrocarbon group, and
each of $R^2$ and $R^4$ is an organic group having a reactive group selected form the group consisting of an acryloxy group, a methacryloxy group, a vinyl group, and a mercapto group.

16. The porous polyolefin resin film according to claim 15, wherein
a molar ratio of an amount of the siloxane unit of formula 1 to a total amount of the siloxane unit of formula 2, the siloxane unit of formula 3, the siloxane unit of formula 4, the siloxane unit of formula 5, and the siloxane unit of formula 6 is from 20/80 to 50/50,
a molar ratio of a total amount of the siloxane unit of formula 2, the siloxane unit of formula 3, and the siloxane unit of formula 4 to a total amount of the siloxane unit of formula 5 and the siloxane unit of formula 6 is from 50/50 to 75/25, and
a molar ratio of a total amount of the siloxane unit of formula 3 and the siloxane unit of formula 5 to a total amount of the siloxane unit of formula 4 and the siloxane unit of formula 6 is from 20/80 to 60/40.

17. The porous polyolefin resin film according to claim 1, further comprising the second resin composition.

* * * * *